United States Patent
Shrestha et al.

(10) Patent No.: US 11,210,068 B2
(45) Date of Patent: Dec. 28, 2021

(54) AUTOMATIC ANONYMIZATION OF WORKFLOW TEMPLATES

(71) Applicant: Microsoft Technology Licensing, LLC, Redmond, WA (US)

(72) Inventors: Prabir Shrestha, Redmond, WA (US); Kartik Rao Polepalli, Redmond, WA (US); Ashwin Sathya Raghunathan, Bellevue, WA (US); Stephen Siciliano, Bellevue, WA (US); Anjli Chaudhry, Seattle, WA (US); Charles Lamanna, Bellevue, WA (US); Merwan Vishnu Hade, Bellevue, WA (US); Sunay Vaishnav, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 607 days.

(21) Appl. No.: 15/417,741

(22) Filed: Jan. 27, 2017

(65) Prior Publication Data
US 2017/0316355 A1    Nov. 2, 2017

Related U.S. Application Data

(60) Provisional application No. 62/329,016, filed on Apr. 28, 2016, provisional application No. 62/328,913, filed on Apr. 28, 2016.

(51) Int. Cl.
*G06F 8/20* (2018.01)
*G06Q 10/06* (2012.01)
(Continued)

(52) U.S. Cl.
CPC ............... *G06F 8/20* (2013.01); *G06F 8/34* (2013.01); *G06F 8/36* (2013.01); *G06F 9/4881* (2013.01);
(Continued)

(58) Field of Classification Search
None
See application file for complete search history.

(56) References Cited

U.S. PATENT DOCUMENTS 6,603,882 B2    8/2003    Oh et al.
6,658,568 B1*  12/2003    Ginter ................... G06F 21/10
                                                                   348/E5.006
(Continued)

FOREIGN PATENT DOCUMENTS

CN    101310233 A    11/2008
CN    102999816 A     3/2013
(Continued)

OTHER PUBLICATIONS

Birnstill, Pascal, and Alexander Pretschner. "Enforcing privacy through usage-controlled video surveillance." 2013 10th IEEE International Conference on Advanced Video and Signal Based Surveillance. IEEE, 2013. (Year: 2013).*

(Continued)

*Primary Examiner* — Thomas L Mansfield
(74) *Attorney, Agent, or Firm* — Fiala & Weaver P.L.L.C.

(57) ABSTRACT

Methods, systems, apparatuses, and computer program products are described herein that generate and assist in managing templates (pre-generated user-customizable automated workflows) that can be used to easily and efficiently develop automated workflows in an automated workflow development system. An automated workflow template for publication that includes parameters is received. At least a portion of the parameters included in the automated workflow template are automatically anonymized to generate an anonymized automated workflow template. The anonymized automated workflow template is published.

20 Claims, 17 Drawing Sheets

(51) Int. Cl.

| | |
|---|---|
| G06Q 10/10 | (2012.01) |
| G06F 40/123 | (2020.01) |
| G06F 40/186 | (2020.01) |
| G06F 8/34 | (2018.01) |
| G06F 8/36 | (2018.01) |
| G06F 9/48 | (2006.01) |
| G06F 3/0482 | (2013.01) |

(52) U.S. Cl.
CPC .......... *G06F 40/123* (2020.01); *G06F 40/186* (2020.01); *G06Q 10/067* (2013.01); *G06Q 10/0633* (2013.01); *G06Q 10/06316* (2013.01); *G06Q 10/10* (2013.01); *G06F 3/0482* (2013.01)

(56) References Cited

U.S. PATENT DOCUMENTS

| | | | |
|---|---|---|---|
| 6,728,762 | B1 | 4/2004 | Estrada et al. |
| 7,065,493 | B1 | 6/2006 | Homsi |
| 7,069,536 | B2 | 6/2006 | Yaung |
| 7,272,616 | B1 | 9/2007 | McKinnon |
| 7,305,656 | B2 | 12/2007 | Fish et al. |
| 7,428,495 | B2 | 9/2008 | Dhar et al. |
| 7,571,069 | B1 | 8/2009 | Farkas et al. |
| 7,840,934 | B2 | 11/2010 | Sayal et al. |
| 7,991,317 | B2 | 8/2011 | Kato et al. |
| 8,117,549 | B2* | 2/2012 | Reiner .................. G06F 19/321 715/751 |
| 8,195,321 | B2 | 6/2012 | Mackelprang et al. |
| 8,301,480 | B2 | 10/2012 | Ramachandran |
| 8,370,293 | B2 | 2/2013 | Iwase et al. |
| 8,392,875 | B2 | 3/2013 | Fish et al. |
| 8,583,466 | B2 | 11/2013 | Margulies et al. |
| 8,639,920 | B2* | 1/2014 | Stack .................. G06Q 30/0269 713/150 |
| 8,781,998 | B2 | 7/2014 | Jafri et al. |
| 8,782,616 | B2 | 7/2014 | Wright |
| 8,984,612 | B1 | 3/2015 | Gat et al. |
| 9,043,870 | B1 | 5/2015 | Barenholz et al. |
| 9,152,402 | B2 | 10/2015 | Scheidel et al. |
| 9,395,959 | B2 | 7/2016 | Hatfield et al. |
| 9,424,112 | B1 | 8/2016 | Malamut et al. |
| 9,557,988 | B2 | 1/2017 | Binjrajka |
| 9,699,207 | B2* | 7/2017 | Chapman ............ H04L 63/1483 |
| 2002/0152254 | A1 | 10/2002 | Teng |
| 2003/0195762 | A1 | 10/2003 | Gleason et al. |
| 2004/0133876 | A1 | 7/2004 | Sproule |
| 2006/0069605 | A1* | 3/2006 | Hatoun .................. G06Q 10/06 705/7.15 |
| 2006/0136490 | A1 | 6/2006 | Aggarwal et al. |
| 2006/0285730 | A1 | 12/2006 | Habets et al. |
| 2007/0038499 | A1 | 2/2007 | Margulies et al. |
| 2007/0050227 | A1 | 3/2007 | Teegan et al. |
| 2007/0106633 | A1 | 5/2007 | Reiner |
| 2007/0236708 | A1 | 10/2007 | Jahn et al. |
| 2009/0006997 | A1 | 1/2009 | Jiang et al. |
| 2009/0171708 | A1 | 7/2009 | Bobak et al. |
| 2009/0183185 | A1 | 7/2009 | Srour et al. |
| 2010/0049740 | A1 | 2/2010 | Iwase et al. |
| 2010/0050183 | A1 | 2/2010 | Ogura |
| 2010/0070945 | A1 | 3/2010 | Tattrie et al. |
| 2010/0106282 | A1 | 4/2010 | Mackelprang et al. |
| 2010/0241990 | A1* | 9/2010 | Gabriel .................. G06Q 10/06 715/810 |
| 2010/0251155 | A1 | 9/2010 | Shah et al. |
| 2011/0225293 | A1* | 9/2011 | Rathod .................. G06Q 10/00 709/224 |
| 2012/0101843 | A1* | 4/2012 | Mathur .................. G06F 19/328 705/2 |
| 2012/0227044 | A1 | 9/2012 | Arumugham et al. |
| 2013/0007244 | A1 | 1/2013 | Gnech et al. |
| 2013/0152038 | A1 | 6/2013 | Lim et al. |
| 2013/0152041 | A1 | 6/2013 | Hatfield et al. |
| 2013/0208966 | A1* | 8/2013 | Zhao .................. G06F 9/5072 382/131 |
| 2014/0053244 | A1* | 2/2014 | Raman ................ G06F 21/6263 726/4 |
| 2014/0075413 | A1 | 3/2014 | Binjrajka |
| 2014/0282367 | A1 | 9/2014 | Harrill et al. |
| 2014/0310052 | A1 | 10/2014 | Foehr et al. |
| 2014/0324501 | A1 | 10/2014 | Davidow et al. |
| 2015/0046915 | A1 | 2/2015 | Oliver et al. |
| 2015/0160809 | A1 | 6/2015 | Mikheev |
| 2015/0347935 | A1* | 12/2015 | Standing ................ H04L 67/10 705/7.27 |
| 2017/0147296 | A1 | 5/2017 | Kumar et al. |
| 2017/0315782 | A1 | 11/2017 | Chaudhry et al. |
| 2017/0315981 | A1 | 11/2017 | Shrestha et al. |
| 2017/0316355 | A1 | 11/2017 | Shrestha et al. |
| 2017/0316363 | A1 | 11/2017 | Siciliano et al. |
| 2019/0272154 | A1 | 9/2019 | Chaudhry et al. |

FOREIGN PATENT DOCUMENTS

| | | |
|---|---|---|
| CN | 104850405 A | 8/2015 |
| CN | 105045228 A | 11/2015 |
| WO | 2012075622 A1 | 6/2012 |
| WO | 2015077896 A1 | 6/2015 |

OTHER PUBLICATIONS

"Nintex", Retrieved From https://www.nintex.com/workflow-platform/mobile#Collections-of-Forms-and-Workflow-Tasks, Apr. 14, 2015, 5 Pages.

"WorkfloPlus User Guide", Retrieved From: https://web.archive.org/web/20151224093515/http://maintenancepro.blob.core.windows.net/downloads/v1.1/WorkfloPlus%20User%20Guide.pdf, Archived On: Dec. 24, 2015, 31 Pages.

"Non Final Office Action Issued in U.S. Appl. No. 15/408,238", dated Apr. 5, 2018, 16 Pages.

Brown, James, "How To Create a Workflow in VMware vRealize Orchestrator", Retrieved From https://virtualizationreview.com/articles/2015/02/11/how-to-create-a-workflow-in-vrealize-orchestrator.aspx, Feb. 11, 2015, 6 Pages.

Cappiello, et al., "Enabling End User Development through Mashups: Requirements, Abstractions and Innovation Toolkits", In the proceedings of Third International Symposium on End User Development, Part of the Lecture Notes in Computer Science Book Series, vol. 6654, Jun. 7, 2011, pp. 9-24.

"International Search Report and Written Opinion Issued in PCT Application No. PCT/US2017/029502", dated Aug. 7, 2017, 13 Pages.

Siciliano, Stephen, "Welcome to Microsoft Flow: Flow Blog", Retrieved from: https://flow.microsoft.com/en-us/blog/welcome-to-microsoft-flow/, Apr. 27, 2016, 6 Pages.

Smalser, Aaron, "What is application access and single sign-on with Azure Active Directory?", Retrieved From: https://azure.microsoft.com/en-us/en.in/documentation/articles/active-directory-appssoaccess-whatis//, Retrieved on: Mar. 8, 2016, 12 Pages.

Soneff, Steven, "One tap sign-up and automatic sign-in without password entry using Smart Lock", Retrieved From https://android-developers.googleblog.com/2015/12/one-tap-sign-up-and-automatic-sign-in.html, 3 Pages.

"Zapier", Published on: Apr. 1, 2016, Available at: <https://zapier.com/developer/documentation/v2/#what-is-zapier>, 4 pages.

"IF by IFTTT", Published on: Jul. 26, 2015, Available at: <https://play.google.com/store/apps/details?id=com.ifttt.ifttt>, 3 pages.

Gonzalez, et al., "Automating the Implementation of Analysis Concerns in Workflow Applications", In Proceedings of IEEE/ACM International Conference on Automated Software Engineering, Nov. 16, 2009, pp. 585-589.

"International Search Report and Written Opinion Issued in PCT Application No. PCT/US2017/029498", dated Jun. 13, 2017, 13 Pages.

"International Search Report and Written Opinion Issued in PCT Application No. PCT/US2017/029500", dated Jun. 13, 2017, 12 Pages.

(56) References Cited

OTHER PUBLICATIONS

"Final Office Action Issued in U.S. Appl. No. 15/408,238", dated Oct. 10, 2018, 18 Pages.
"Non Final Office Action Issued in U.S. Appl. No. 15/417,845", dated Sep. 27, 2018, 22 Pages.
"Non Final Office Action Issued in U.S. Appl. No. 15/417,845", dated Dec. 30, 2019, 18 Pages.
"Non Final Office Action Issued in U.S. Appl. No. 16/418,391", dated May 12, 2020, 9 Pages.
"Summons to Attend Oral Proceedings Issued in European Patent Application No. 17734873.7", dated Apr. 1, 2020, 10 Pages.
"Final Office Action Issued in U.S. Appl. No. 15/417,845", dated Jul. 8, 2020, 15 Pages.
"First Office Action and Search Report Issued in Chinese Patent Application No. 201780025654.1", dated May 21, 2021, 15 Pages.
"Non Final Office Action Issued In U.S. Appl. No. 15/417,845", dated Aug. 12, 2021, 18 Pages.

* cited by examiner

AUTOMATIC ANONYMIZATION OF WORKFLOW TEMPLATES

CROSS REFERENCE TO RELATED APPLICATIONS

This application claims the benefit of U.S. Provisional Application No. 62/329,016, filed on Apr. 28, 2016, titled "Template Generation and Management for Automated Workflow Development Application," and of U.S. Provisional Application No. 62/328,913, filed on Apr. 28, 2016, titled "Simplified Access to and Sign-Up for Automated Workflow Development System," which are both incorporated by reference herein in their entireties.

BACKGROUND

A business or enterprise application is a computer program used by business users to perform various business functions. Business applications are frequently developed when available off-the-shelf software does not completely address the desired functionality. Many business applications are interactive, having a graphical user interface (GUI) via which users can input data, submit data queries, perform operations, and view results. Consumer applications are less business-focused, instead being focused on the needs of the consumer.

Business and consumer users tend to depend on information technology (IT) personnel to code their applications due to application complexity, and the programming expertise required. Merely designing an application to pull data from a remote source (e.g., a cloud service) is difficult, typically requiring an experienced software developer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are described herein that generate and assist in managing templates (pre-generated user-customizable automated workflows) that can be used to easily and efficiently develop automated workflows in an automated workflow development system.

In particular, methods, systems, apparatuses, and computer program products are described herein for automatically generating templates (pre-generated user-customizable automated workflows) that can be presented to a user of an automated workflow development application and that can be used thereby to easily and efficiently develop automated workflows.

Methods, systems, apparatuses, and computer program products are also described herein for automatically generating human-readable names for and descriptions of automated workflows (including templates) generated using an automated workflow development application.

Methods, systems, apparatuses, and computer program products are further described herein that enable compatible workflow steps to be automatically suggested based on a selected workflow step. The selected workflow step, and one or more of the compatible workflow steps may be combined to form a workflow template.

Methods, systems, apparatuses, and computer program products are further described herein that automatically anonymize at least a portion of the parameters included in a workflow template to generate an anonymized automated workflow template. The anonymized automated workflow template may then be published.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further serve to explain the principles of the embodiment and to enable a person skilled in the relevant art(s) to make and use the embodiments.

Figure 1:
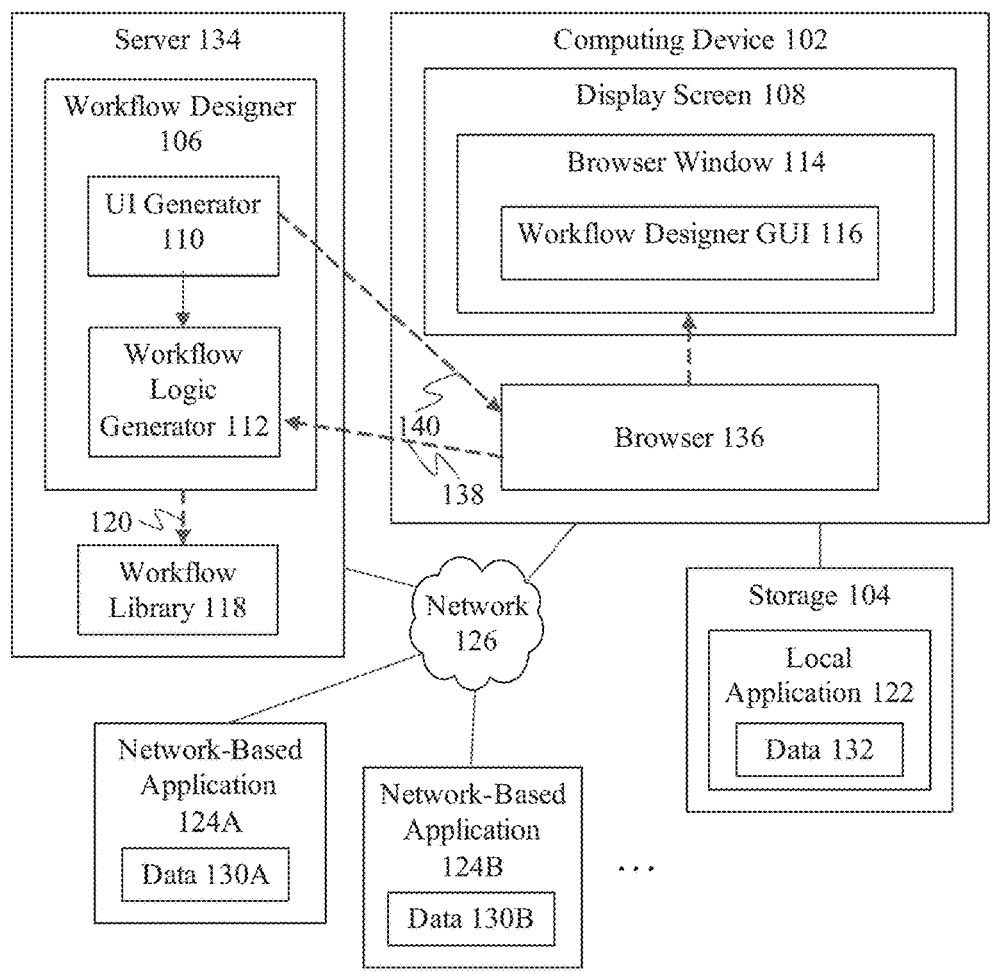
FIG. 1 shows a workflow development system, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Automated Workflow Development System

Business applications and consumer applications typically are created when available off-the-shelf software does not completely address desired functionality. Many business and consumer applications are interactive, having a graphical user interface (GUI) into which users can input data, use to submit data queries, use to perform operations, and/to use to view results.

Users tend to depend on information technology (IT) personnel to code their applications due to application complexity and the programming expertise required. For instance, configuring an application to pull data from a source of interest to enterprises or consumers (e.g., data from an SQL (structured query language) database, customer relationship information from Salesforce.com of San Francisco, Calif., social network information from Facebook® operated by Facebook, Inc. of Palo Alto, Calif., or Twitter® operated by Twitter, Inc. of San Francisco, Calif.) is a difficult process.

Embodiments enable easier development of user applications, including business applications and consumer applications. Developers are enabled to develop user applications in the form of workflows without having to be expert programmers.

Example embodiments are described in the following sections for development of user application workflows. In the following description, a person that develops a user application using the techniques described herein is referred to as a "developer," to be distinguished from a person that uses the user application at runtime (a "user" or "end user"). It is noted, however, that a "developer," as referred to herein, does not need to have expertise in computer programming.

The embodiments described herein enable application development without special programming skills.

A. Example Workflow Development Embodiments

Development of workflows may be enabled in various ways in embodiments. For instance, FIG. 1 shows a workflow development system 100, according to an example embodiment. As shown in FIG. 1, system 100 includes a computing device 102, storage 104, a first network-based application 124A, a second network-based application 124B, and a server 134. Server 134 includes a workflow designer 106 and a workflow library 118 (e.g., in storage). Workflow designer 106 includes an UI generator 110 and a workflow logic generator 112. Computing device 102 includes a display screen 108 and a browser 136. Storage 104 stores a local application 122. System 100 is described as follows.

Computing device 102 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Server 134 may include one or more server devices and/or other computing devices.

Local application 122 in storage 104 is an example of an application accessible by computing device 102 without communicating over a network. Local application 122 may be configured to perform data processing and/or data hosting operations when executed by a processor of computing device 102, and may provide data 132 to workflows created by workflow designer 106 during runtime of those workflows. Local application 122 may be any type of local application/service, such as a database application (e.g., QuickBooks®, a Microsoft® Excel® spreadsheet), a messaging application (e.g., Microsoft® Outlook®), a productivity application (e.g., Microsoft® Word®, Microsoft® PowerPoint®, etc.), or another type of application. Although FIG. 1 shows a single local application, any number of local applications may be present at computing device 102, including numbers in the tens, hundreds, or greater numbers.

First and second network-based applications 124A and 124B are examples of network-based applications, also referred to as "cloud" applications or services. Network-based applications 124A and 124B are accessible by computing device 102 over network 126, may be configured to perform data processing and/or data hosting operations, and may provide data 130A and 130B, respectively, to workflows created by workflow designer 106 during runtime of those workflows. Network-based applications 124A and 124B may each be any type of web accessible applications/services, such as database applications, social networking applications, messaging applications, financial services applications, news applications, search applications, web-accessible productivity applications, cloud storage and/file hosting applications, etc. Examples of such applications include a web-accessible SQL (structured query language) database, Salesforce.com™, Facebook®, Twitter®, Instagram®, Yammer®, LinkedIn®, Yahoo! ® Finance, The New York Times® (at www.nytimes.com), Google search, Microsoft® Bing, Google Docs™, Microsoft® Office 365, Dropbox™, etc. Although FIG. 1 shows two network-based applications, any number of network-based applications may be accessible over network 126, including numbers in the tens, hundreds, thousands, or greater numbers.

Note that data 128, data 130A, data 130B, and data 132 may each include any type of data, including messages, notifications, calculated data, retrieved data, and/or any other type of information requested or usable by a workflow.

Computing device 102 and server 134 may each include at least one network interface that enables communications with each other and with network-based applications 124A and 124B over network 126. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN), a personal area network (PAN), and/or a combination of communication networks, such as the Internet.

Workflow designer 106 (also referred to as an automated workflow development system) is configured to be operated/interacted with to create workflows. For instance, a developer may access workflow designer 106 by interacting with an application at computing device 102 capable of accessing a network-based application, such as browser 136. The developer may use browser 136 to traverse a network address (e.g., a uniform resource locator) to workflow designer 106, which invokes a workflow designer GUI 116 (e.g., a web page) in a browser window 114. The developer is enabled to interact with workflow designer GUI 116 to develop a workflow.

As shown in FIG. 1, workflow designer 106 includes UI generator 110 and workflow logic generator 112. UI generator 110 is configured to transmit workflow GUI information 140 (e.g., one or more web pages, image content, etc.) to browser 136 to be displayed as workflow designer GUI 116 in display screen 108 in browser window 114. Workflow designer GUI 116 may be interacted with by the developer to select and configure workflow steps into a workflow. For example, the developer may insert and sequence a plurality of workflow steps in workflow designer GUI 116, with one or more of the steps being associated with a local or network-based application. Browser 136 stores the selected workflow steps, corresponding configuration information, and workflow step sequence information as constructed workflow information 138.

Constructed workflow information 138 is transmitted to workflow logic generator 112 at server 134. Workflow logic generator 112 generates workflow logic 120 based on the assembled workflow represented by constructed workflow information 138. The workflow represented by workflow logic 120 may subsequently be invoked at runtime by an end user.

During runtime of the workflow, workflow logic 120 may invoke operation of one or more local or network-based applications associated with the workflow steps of workflow logic 120. Each workflow step may receive input data 128 from workflow designer GUI 116, data 132 from local application 122, data 130A or data 130B from one or both of local or network-based applications 124A and 124B, and/or data from another workflow step of workflow logic 120.

Figure 2:
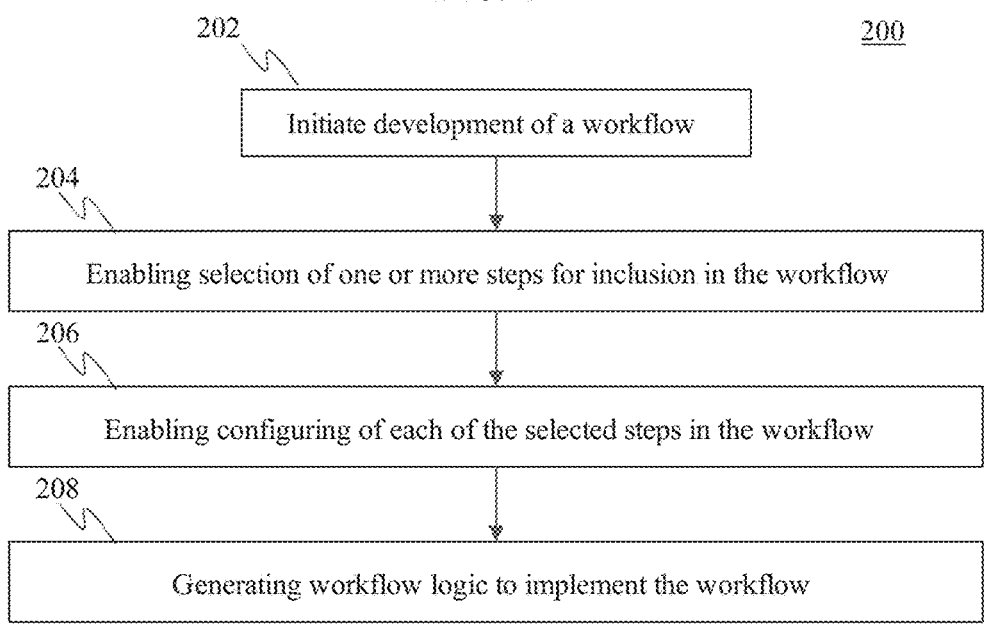
FIG. 2 shows a flowchart providing a process for development of workflows, according to an example embodiment.
Figure 3:
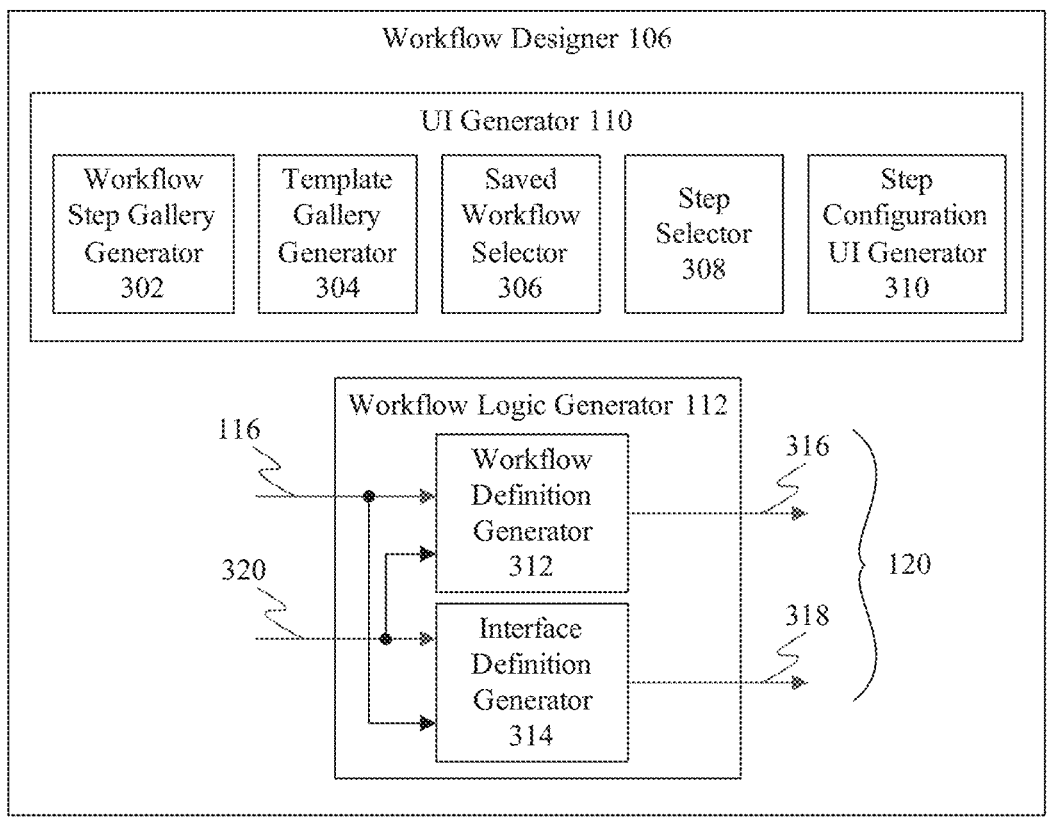
FIG. 3 shows a block diagram of a workflow designer application, according to an example embodiment.
Figure 4:
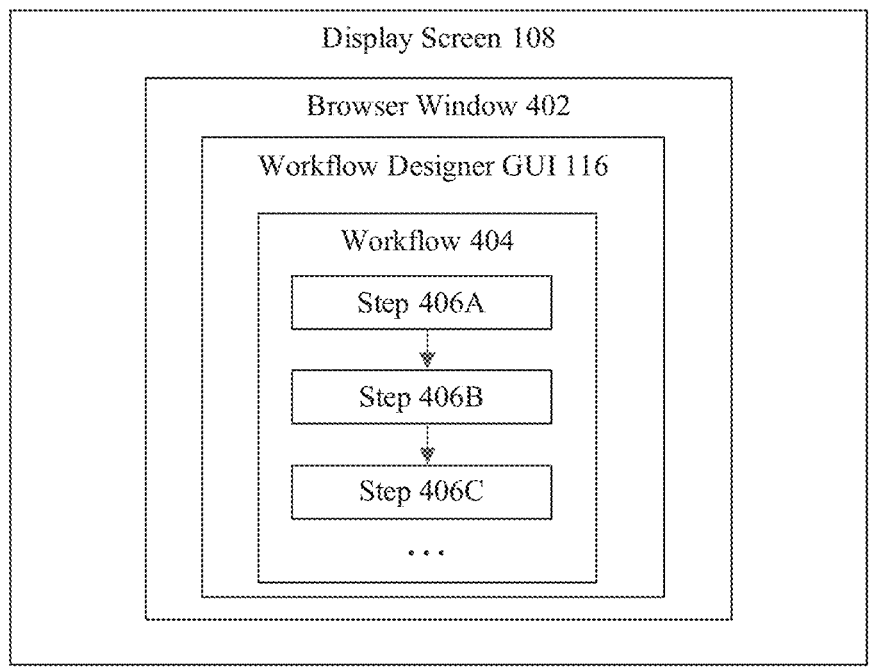
FIG. 4 shows a block diagram of a display screen showing a browser window displaying an exemplary workflow, according to an example embodiment.

Workflow designer 106 may operate in various ways, to enable development of a workflow. For instance, in embodiments, workflow designer 106 may operate according to FIG. 2. FIG. 2 shows a flowchart 200 providing a process for development of workflows, according to an example embodiment. Flowchart 200 and workflow designer 106 are described as follows with respect to FIGS. 3 and 4. FIG. 3 shows a block diagram of workflow designer 106, according to an example embodiment. As shown in FIG. 3, workflow designer 106 includes UI generator 110 and workflow logic generator 112. UI generator 110 includes a workflow step gallery generator 302, a template gallery generator 304, a saved workflow selector 306, a step selector 308, and a step configuration UI generator 310. Workflow logic generator 112 includes a workflow definition generator 312 and an interface definition generator 314. FIG. 4 shows a block diagram of display screen 108, illustrating an example of workflow designer GUI 116 displayed in browser window 402 on display screen 108, according to an example embodiment Flowchart 200 of FIG. 2 begins with step 202. In step 202, development of a workflow is initiated. For example, in an embodiment, workflow designer 106 may be invoked by a developer interacting with browser 136 at computing device 102. The developer may traverse a link or other network address directed to workflow designer 106 at server 134, to invoke workflow designer 106, causing workflow designer 106 to provide workflow GUI information 140 (e.g., one or more web pages, image content, etc.) to browser 136 to be displayed as workflow designer GUI 116 in display screen 108 in browser window 114. Once invoked, the developer may open an existing workflow for further development, or may begin a new workflow.

For instance, a displayed page of workflow designer GUI 116 may display a gallery or workflow steps generated by workflow step gallery generator 302. The workflow step gallery includes a plurality of selectable workflow steps. The workflow steps may be stored in workflow library 118, and accessed for display by workflow designer GUI 116. The developer may select one of the workflow steps for inclusion in their workflow, and may proceed with configuring the contents of the workflow step, and/or may add additional workflow steps to continue generating their workflow.

For example, as shown in FIG. 4, workflow step gallery generator 302 may enable steps 406A, 406B, and 406C to be selected for insertion into a workflow 404 being assembled in workflow designer GUI 116. Any number of workflow steps may be inserted.

In another example, a displayed page of workflow designer GUI 116 may display a template gallery generated by template gallery generator 304. The template gallery includes a plurality of selectable workflow templates, which each include one or more workflow steps pre-connected for operation. The workflow templates may be stored in workflow library 118, and accessed for display by workflow designer GUI 116. The developer may select one of the workflow templates for inclusion in their workflow, and may proceed with configuring the contents of the workflow template, and/or may add additional workflow steps to the workflow steps of the workflow template to generate a more complex workflow.

For instance, in the example of FIG. 4, steps 406A and 406B may have been included in a workflow template placed in workflow 404, step 406C may have been subsequently added (e.g., from a workflow step gallery).

In another example, saved workflow selector 306 may enable the developer to select an existing, saved workflow to be opened for further editing in a displayed page of workflow designer GUI 116. The saved workflows may be stored in workflow library 118 or elsewhere. For example, saved workflow selector 306 may display a list of saved workflows, may enable navigation to a saved workflow, and/or may provide another mechanism for selecting a saved workflow for editing. The developer may then proceed with further configuring the contents of the workflow, and/or may add additional workflow steps to the workflow steps of the workflow to generate a more complex workflow.

In step 204, selection of one or more steps for inclusion in the workflow is enabled. When a developer is editing a workflow, step selector 308 may enable the developer to select further workflow steps for inclusion in the workflow, and to order the steps. The workflow steps may be accessed by step selector 308 in workflow library 118. For instance, step selector 308 may display a pull-down menu of workflow steps, a scrollable and/or searchable list of available workflow steps, or may provide the workflow steps in another manner, and may enable the developer to select any number of workflow steps from the list for inclusion in the workflow.

In one example, step selector 308 may enable a developer to select a step that is associated with a local application, such as Microsoft® Outlook®, or a network-based application, such as Facebook®. Step selector 308 enables the steps to be chained together in a sequence, optionally with conditional steps, for inclusion in workflow logic 120.

In step 206, each of the selected steps in the workflow is enabled to be configured. In an embodiment, step configuration UI generator 310 enables configuration of each workflow step in a workflow. Step configuration UI generator 310 accesses each selected workflow step in workflow library 118 to determine the configuration of the workflow step, including all of its input parameters and any other selections or information that a user or developer needs to provide to the workflow step to configure it For example, step configuration UI generator 310 may generate a UI that enables the developer to type, navigate to, use a pull-down menu, or otherwise enter input data into a text input box or other data input element (e.g., input parameter) of a workflow step. The developer may configure an output of a prior step to be input data for a workflow step. Step configuration UI generator 310 may enable data or other objects to be copied and pasted, dragged and dropped, or otherwise entered copied from elsewhere into data input boxes of a workflow step.

In step 208, workflow logic to implement the workflow is generated. In an embodiment, workflow logic generator 112 is configured to package and generate workflow logic 120 based on constructed workflow information 138 when the developer indicates the workflow is finished, such as when the developer interacts with workflow designer GUI 116 to save the workflow. As shown in FIG. 3, workflow logic generator 112 receives constructed workflow information 138. Constructed workflow information 138 indicates which workflow steps have been inserted into the workflow, their input parameter values, and their sequencing. Workflow logic generator 112 also receives selected workflow logic 320, which is the workflow logic for each workflow step of the workflow as indicated in constructed workflow information 138. In one example, workflow logic generator 112 retrieves workflow logic from workflow library 118 for each workflow step indicated in constructed workflow information 138, to receive selected workflow logic 320. Workflow logic generator 112 generates workflow logic 120 for the workflow based on constructed workflow information 138 and selected workflow logic 320. For example, workflow logic generator 112 may generate workflow logic 120 in the form of an executable file, a zip file, or other form, which may be executed in a standalone fashion, may be executed in a browser, or may be executed in another manner, depending on the particular type of workflow being generated.

With reference to FIG. 3, workflow logic generator 112 may generate workflow logic 120 to include at least two components (e.g., files): workflow definition information 316 and interface definition information 318. Workflow definition information 316 includes information that defines the sequence and operation of the workflow of workflow logic (e.g., lists the workflow step operations and their ordering/sequencing) and includes the parameter values for the workflow. For example, workflow definition information 316 may be generated to contain information in the format of a JSON (JavaScript object notation) file or in another form. Interface definition information 318 includes information that defines the interfaces/parameters (e.g., inputs and outputs) of the workflow steps of the workflow. For example, interface definition information 318 may be generated to contain information in the format of a Swagger (a specification for REST (representational state transfer) web services) file or in another form. For instance, each workflow step may be represented in workflow library 118 as API (application programming interface) metadata in Swagger format, defining what are the necessary inputs and outputs (parameters) of the workflow step, such that a service may be accessed according to the API definition. In such an implementation, the operations in the workflow definition information 316 refer to the corresponding API metadata in the interface definition information 318 to give a complete structure of a generated workflow (e.g., each sequenced workflow step/operation defined with parameter values in the workflow definition information 316 has a corresponding API, which is defined in the interface definition information 318).

Accordingly, flowchart 200 and workflow designer 106 enable a developer to create workflows. FIGS. 5-8 shows views of an exemplary workflow in various phases of development using a development GUI, according to example embodiments. For example, each of FIGS. 5-8 show browser window 402 displaying a corresponding view of workflow designer GUI 116 being used to develop a workflow.

Figure 5:
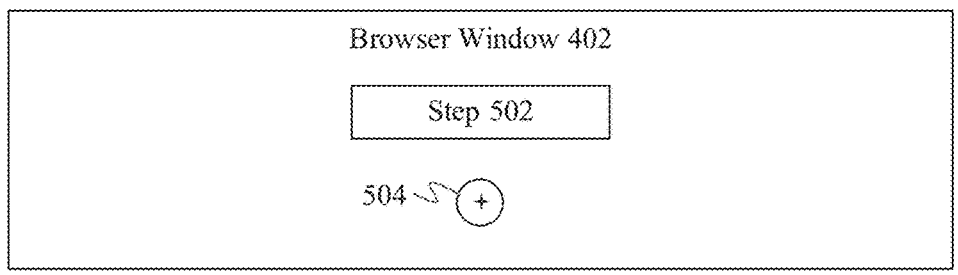
FIGS. 5-8 shows views of an exemplary workflow in various phases of development using a development GUI, according to example embodiments.

For instance, FIG. 5 shows browser window 402 including a workflow step 502 and an add interface 504. Workflow step 502 was selected by a developer to be a first step in a workflow. Add interface 504 (e.g., a button or other GUI control) may be interacted with by the developer to add further workflow steps to the workflow.

As described above, a developer is enabled to select workflow step 502 from a list or library of steps, a gallery of workflow steps, a template gallery, or elsewhere. A list, library, or gallery may include any number of workflow steps. The workflow steps may be associated with network-based applications mentioned elsewhere herein or otherwise known (e.g., Dropbox™), and/or with local applications mentioned elsewhere herein or otherwise known (e.g., Microsoft® Outlook®). Each workflow step is configured for plug-and-place into the workflow. Each workflow step is configured with the appropriate logic and/or interface(s) to perform its respective function(s), which may include communicating with a local or remote application. For instance, a workflow step may be configured to transmit a query to an application (e.g., a search query to a search engine, a database query to a database, a request for data from a social networking application, etc.), being pre-configured how to properly transmit and format such a request to the application. The workflow step may be configured to receive a response to the request, being pre-configured how to parse the response for desired response data. As such, a developer of a workflow does not need to know how to write program code in a programming language, to interface with complex application interfaces (e.g., application programming interfaces (APIs)), or to understand network communication protocols, as the workflow steps are already setup. When a workflow step is plugged into workflow logic by a developer, the developer configures the inputs to the workflow step (as described below), and the otherwise pre-configured workflow step handles any communications with other applications.

Figure 6:
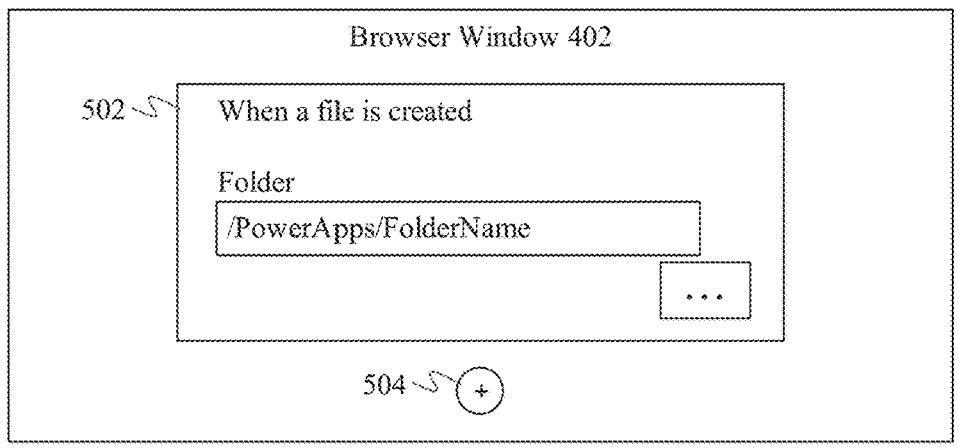

In FIG. 6, the developer has interacted with step 502 (e.g., by mouse click, etc.) to cause step configuration UI generator 310 to generate a UI for configuration of step 502. For instance, in the example of FIG. 6, workflow step 502 is configured to monitor for a file to be created in a particular folder identified by the developer in a text input box (e.g., by typing, clicking on a navigator indicated by " . . . ", etc.). When workflow step 502 determines a file is added to the indicated folder, a workflow step following workflow step 502 is triggered. Thus, workflow step 502 may be considered a trigger step in this example.

Figure 7:
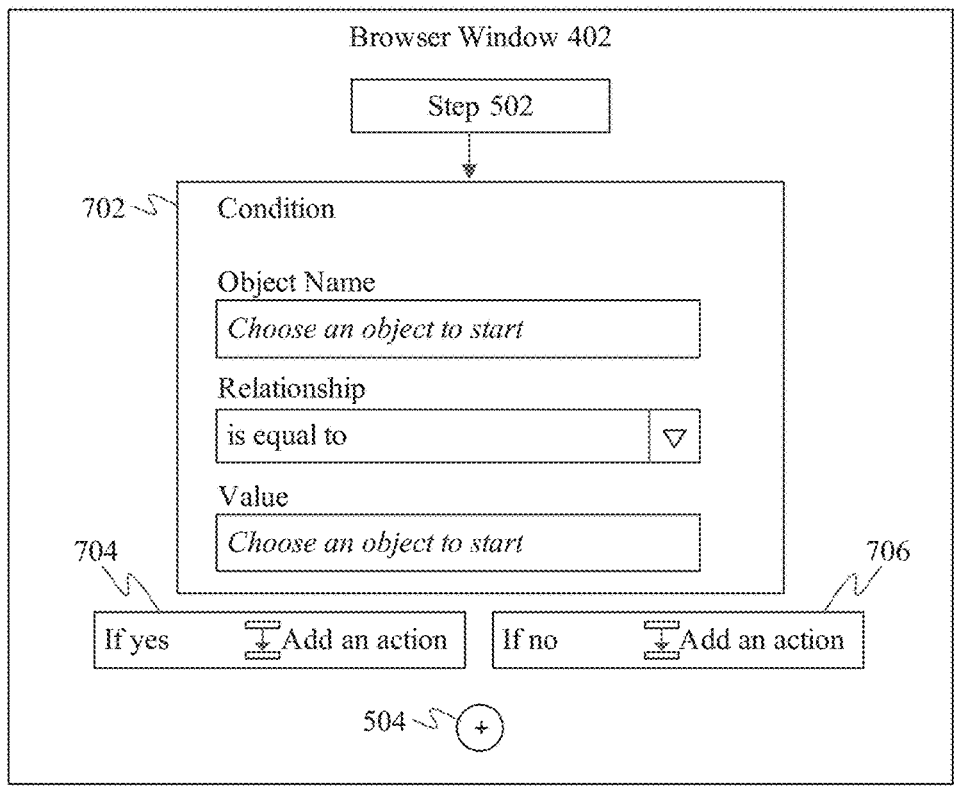

For instance, in FIG. 7, the developer interacted with add interface 504 to select a next workflow step 702. In an embodiment, interaction with add interface 504 invokes step selector 308 in FIG. 3, which enables the developer to select a workflow step. In the example of FIG. 7, workflow step 702 is a conditional step. In embodiments, logical elements may be selected for inclusion in a workflow, including arithmetic logic (e.g., summers, multipliers, etc.), conditional logic, etc., that operate based on variable values determined in earlier workflow steps. The condition of workflow step 702 enables the workflow to fork based on the determination of a condition (e.g., a variable value). The condition may include an object name, a relationship (e.g., a logical relationship, such as equal to, includes, not equal to, less than, greater than, etc.), and a value, which are all defined by the developer interacting with workflow step 702. Corresponding action steps may be performed depending on which way the workflow forks based on the condition.

In one illustrative example of FIG. 7, the object name may be selected (e.g., from a list of possibilities) to be a name of the created file of workflow step 502, the relationship may be "contains" (e.g., selected by a pull-down menu) and the value may be "dummyfile" (e.g., typed in by the developer). The condition evaluates to a "yes" condition if the file name contains "dummyfile," which invokes first action workflow step 704, and evaluates to "no" condition if the file name does not contain "dummyfile," which invokes second action workflow step 706. An action may be defined for one or both of the "yes" and "no" action workflow steps 704 and 706 by the developer, if desired.

Figure 8:
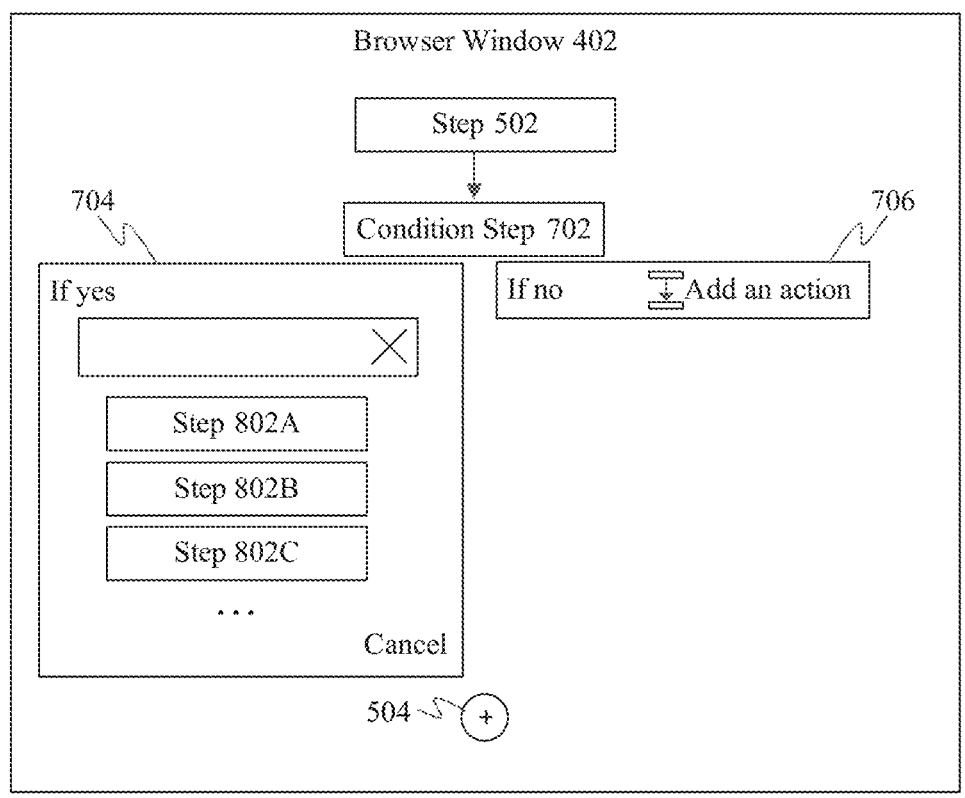

For example, in FIG. 8, the developer interacts with action workflow step 704 to define an action. In this example, the developer is defining action workflow step 704 by selecting a workflow step via step selector 308. As shown in FIG. 8, a list of workflow steps 802A, 802B, 802C is displayed, from which the developer can select a workflow step (e.g., by mouse click, etc.) to be performed for action workflow step 704. The workflow step can be a trigger step, an action step, or a condition step. After selecting the workflow step, the developer may configure the workflow step as described above. Furthermore, the developer may configure an action for workflow step 706, may add further workflow steps, etc., eventually being enabled to save the workflow.

It is noted that in some embodiments, a workflow step, such as first workflow step 502, may require credentials (e.g., a login and password) to access indicated data (e.g., to access a file at the location indicated in the text input box in FIG. 6). As such, the developer may be requested to provide credential information in association with first workflow step 502 so that when first workflow step 502 is performed during runtime, the data may be accessed. Alternatively, the credentials may be requested of a user during runtime.

B. Example Runtime Embodiments

According to embodiments, end users may execute workflows developed as described herein. During operation, an end user may interact with a GUI of the workflow, which may lead to workflow logic being executed. The workflow logic may execute locally (e.g., in a browser) and/or at a remote service (in "the cloud"). The workflow logic may access data of one or more applications, local or network-accessible, as was configured by the developer. Accordingly, the workflow performs its intended functions.

Figure 9:
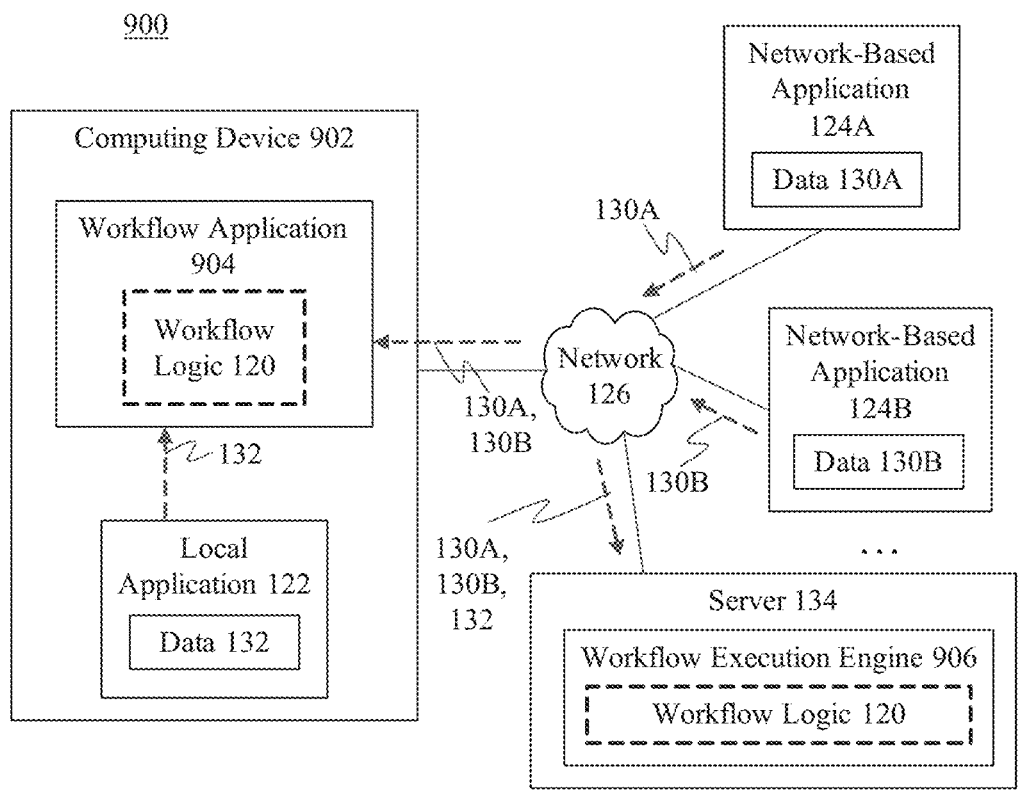
FIG. 9 shows a block diagram of a system for operating a workflow, according to an example embodiment.

FIG. 9 shows a block diagram of a system 900 for operating a workflow that includes one or more workflow steps, according to an example embodiment. As shown in FIG. 9, system 900 includes a computing device 902, first network-based application 124A, second network-based application 124B, and server 134. Computing device 902 includes a workflow application 904. Server 134 includes a workflow execution engine 906. System 100 is described as follows.

First and second network-based applications 124A and 124B are each optionally present, depending on the configuration of workflow logic 120. Further network-based applications may be present, depending on the configuration of workflow logic 120.

Computing device 902 may be any type of stationary or mobile computing device described herein or otherwise known. Computing device 902 is configured to communicate with first and second network-based applications 124A and 124B and server 134 over network 126.

In one embodiment, workflows are executed at server 134 by workflow execution engine 906, and workflow application 904 is a UI application that enables a user at computing device 902 to interact with the executing workflows, such as by selecting and invoking the workflows, receiving communications from the executing workflows (e.g., messages, alerts, output data, etc.), providing requested input data to executing workflows, etc. In such an embodiment, workflow application 904 may be a workflow UI application associated with workflow execution engine 906 (e.g., workflow application 904 may be an extension of workflow execution engine 906) that may operate separate from or within a browser at computing device 902, or may be configured in another way. As shown in FIG. 9, workflow execution engine 906 may load workflow logic 102 for a selected workflow (e.g., selected from a workflow library by a user), and may execute workflow logic 102 to execute the workflow.

In another embodiment, workflow application 902 may be configured to execute workflows at computing device 902. For instance, an end user of computing device 902 may interact with a user interface of workflow application 902 to select and invoke a particular workflow (e.g., selected from a workflow library). In such embodiments, workflow logic 120 may operate separate from or in a browser at computing device 902, or may be configured in another way. As shown in FIG. 9, workflow application 904 may load workflow logic 120 for a selected workflow (e.g., selected from a workflow library by a user), and may execute workflow logic 120 to execute the workflow.

In another embodiment, a first portion of workflow logic 120 may operate in workflow application 904 at computing device 902 and a second portion of workflow logic 120 may operate in workflow execution engine 906 at server 134 and/or elsewhere.

Figure 10:
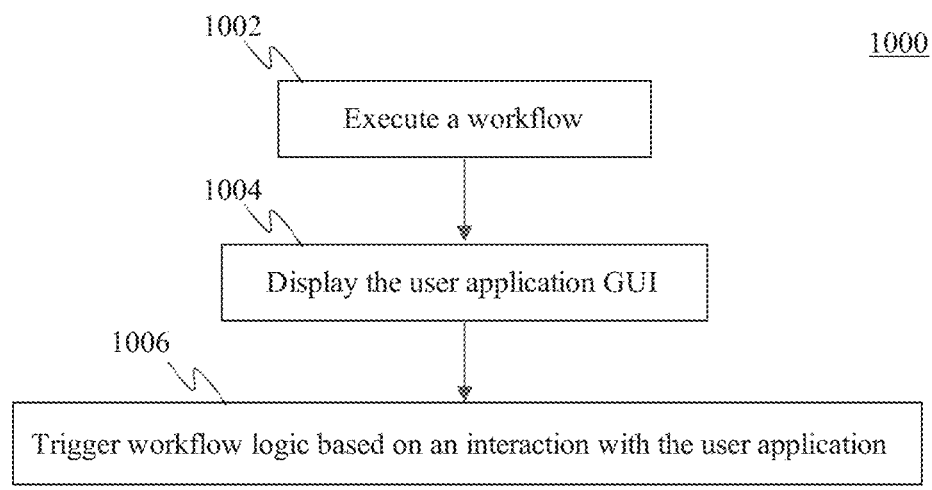
FIG. 10 shows a flowchart providing a process for executing a user application that includes one or more workflows, according to an example embodiment.

FIG. 10 shows a flowchart 1000 providing a process for executing workflow logic 120 of a workflow, according to an example embodiment. Flowchart 1000 is described as follows with respect to system 900 of FIG. 9 for illustrative purposes.

Flowchart 1000 begins with step 1002. In step 1002, the workflow is executed. In an embodiment, an end user at computing device 902 may cause workflow logic 120 to be executed, such as by command line, by clicking/tapping or otherwise interacting with an icon representing the application, by selection in a browser, or in another manner. As described above, workflow logic 120 may execute in workflow application 904 at computing device 902 and/or in workflow execution engine 906 at server 134. When executed, the workflow steps of workflow logic 120 are performed in the configured sequence. Accordingly, one or more of the workflow steps may make calls to corresponding applications/services to perform their functions, such as local application 122 (to return data 132), network-based application 124A (to return data 130A), network-based application 124B (to return data 130B), and/or other applications, local or network-based.

In step 1004, the workflow GUI is displayed. Step 1004 is optional, as in some embodiments, a GUI is not displayed for a workflow. In an embodiment, the GUI may be displayed by workflow application 904 at computing device 902. When displayed, the user may interact with the GUI by reviewing displayed data (e.g., from a file, database record, spreadsheet, or other data structure read by the workflow), by entering data into the GUI (e.g., by typing, by voice, etc.), and/or by interacting with one or more controls displayed by the GUI.

In step 1006, workflow logic is triggered based on an interaction with the workflow. Step 1006 is optional in cases where one or more workflow steps of a workflow require input from a user. In such cases, the user interacts with a control in a GUI of workflow application 904 associated with a workflow step of workflow logic 120 to provide information that triggers logic of the workflow step to operate.

In this manner, workflow logic 120 performs its functions, such as processing orders, tracking information, generating messages, processing documents to generate tasks or information, collecting feedback, and/or any other functions.

III. Automatic Generation of Templates in an Automated Workflow Development System As described above with respect to FIG. 3, template gallery generator 304 may enable display of a template gallery that includes a plurality of selectable workflow templates that each include one or more workflow steps pre-connected for operation. The workflow templates may be stored in workflow library 118 (FIG. 1), and accessed for display by workflow designer GUI 116. The developer may select one of the workflow templates for inclusion in their workflow, and may proceed with configuring the contents of the workflow template, and/or may add additional workflow steps to the workflow steps of the workflow template to generate a more complex workflow.

Figure 11:
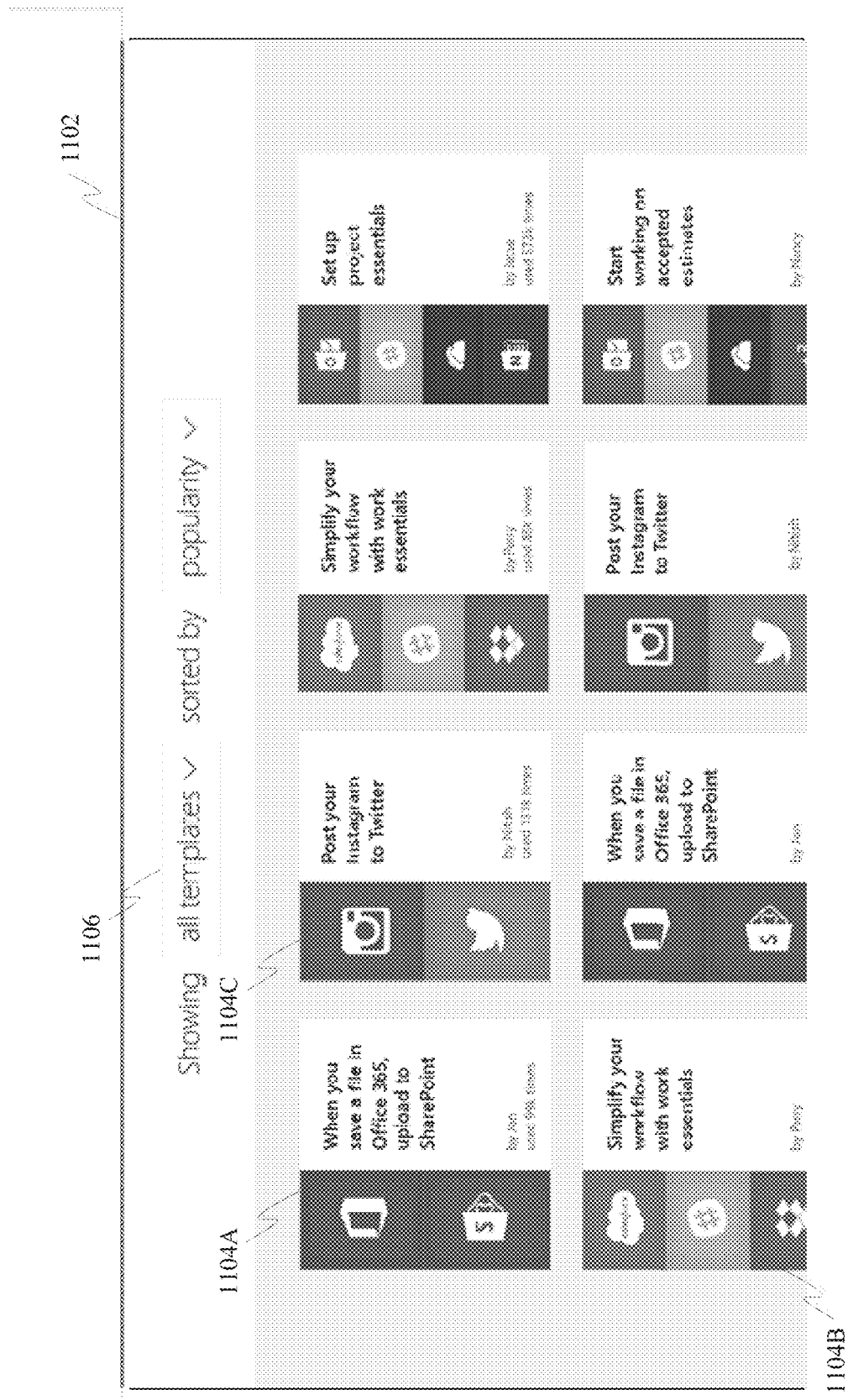
FIG. 11 depicts an example interactive display screen of an automated workflow development system via which one or more manually-generated or automatically-generated templates may be presented to a user in accordance with an embodiment.

FIG. 11 depicts an example interactive display screen 1102 of workflow designer GUI 116 via which one or more manually-generated or automatically-generated templates may be presented to a user in accordance with an embodiment. As shown in FIG. 11, a plurality of workflow templates indications is shown, including workflow template indications 1104A-1104C. Each workflow templates indication is represented by a rectangular icon and by a text description of the functionality of the workflow template. Thus for example, the templates presented to the user in FIG. 11 include "When you save a file in Office 365, upload to SharePoint" (workflow template 1104A), "Post your Instagram to Twitter" (workflow template 1104C), "Simplify your workflow with work essentials" (workflow template 1104B), "Set up project essentials", and "Start working on accepted estimates".

Each workflow template is defined as a combination of steps. For example, a template (e.g., workflow template 1104A) may be defined as a combination of a trigger ("When you save a file in Office 365") and an action that is carried out when the trigger is activated ("upload to SharePoint"). Each step included in the template may include an interaction with a particular connector or service that is accessed using a suitable application programming interface (API). That is to say, each connector (e.g., DropBox, Outlook, Bing Search, SharePoint, etc.) may enable one or more operations to be performed with respect to that connector.

When a user selects a particular template indicated on the screen (e.g., by touching it on a touch screen, by pointing to it with a mouse and clicking, or the like), the user is taken to a workflow designer screen (e.g., browser window 402 of FIG. 7) that provides a graphical representation of each of the steps of the template and that provides a means by which the user can customize various parameters referenced by each of the steps, as well as a means by which the user can add, modify or remove steps, test the automated workflow, and save the automated workflow.

In an embodiment, each of the templates that are presented to the user via interactive display screen 1102 shown in FIG. 11 may represent an automated workflow that was developed manually by a person, stored, and then published for use by others. However, in an embodiment in which there are a large number of connectors each of which may have a large number of operations, the number of possible templates that may be generated by combining different connector operations can be extremely large and it may simply not be possible to manually generate (and optionally tailor) every possible template.

To address this issue, template generation logic of workflow designer 106 may be configured to automatically generate new templates that may be presented to the user by automatically combining different connector operations. Each new combination can be presented as a new template via an interactive display screen such as that shown in FIG. 11. Thus, for example, the template generation logic can automatically combine an Office 365 operation of saving a file with a SharePoint operation of uploading a file to automatically create a template that uploads a file to SharePoint whenever a file is saved in Office 365.

In an embodiment, the template generation logic is also configured to automatically generate text describing the operations performed by the newly-generated template. Thus, in further accordance with the foregoing example, the template generation logic can automatically generate the text "When you save a file in Office 365, upload to SharePoint".

In a further embodiment, telemetry/usage statistics may be collected about which manually-generated and automatically-generated templates are utilized by users. Based on such usage information, a determination can be made about which templates are popular with users. This information can in turn be used to determine which templates should be highlighted for users on an interactive display screen, what type of templates should be automatically generated in the future, and/or what type of templates should be manually generated and/or tailored in the future.

Figure 12:
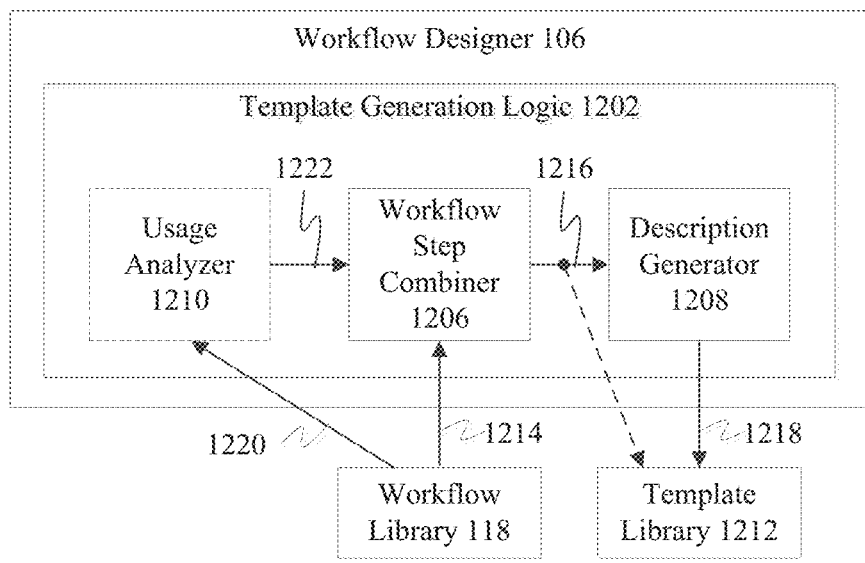
FIG. 12 shows a block diagram of a workflow designer configured to automatically generate workflow templates, according to an example embodiment.

Accordingly, in embodiments, a workflow designer may be configured to generate workflow templates. For example, FIG. 12 shows a block diagram of workflow designer 106 configured to automatically generate workflow templates, according to an example embodiment. As shown in FIG. 12, workflow designer 106 includes template generation logic 1202. Template generation logic 1202 is configured to automatically generate templates (pre-generated user-customizable automated workflows) that can be presented to a user and that can be used thereby to easily and efficiently develop automated workflows. As shown in FIG. 12, template generation logic 1202 includes a workflow step combiner 1206, a description generator 1208, and a usage analyzer 1210. Workflow step combiner 1206 is configured to combine workflow steps to generate workflow templates. Description generator 1208 is configured to generate labels for the generated workflow templates. Usage analyzer 1210 is optionally present. When present, usage analyzer 1210 is configured to monitor the usage of workflow steps and the creation of workflows from workflow steps by users, and usage statistics based thereon may be used to determine desired combinations of workflow steps to form into templates.

Figure 13:
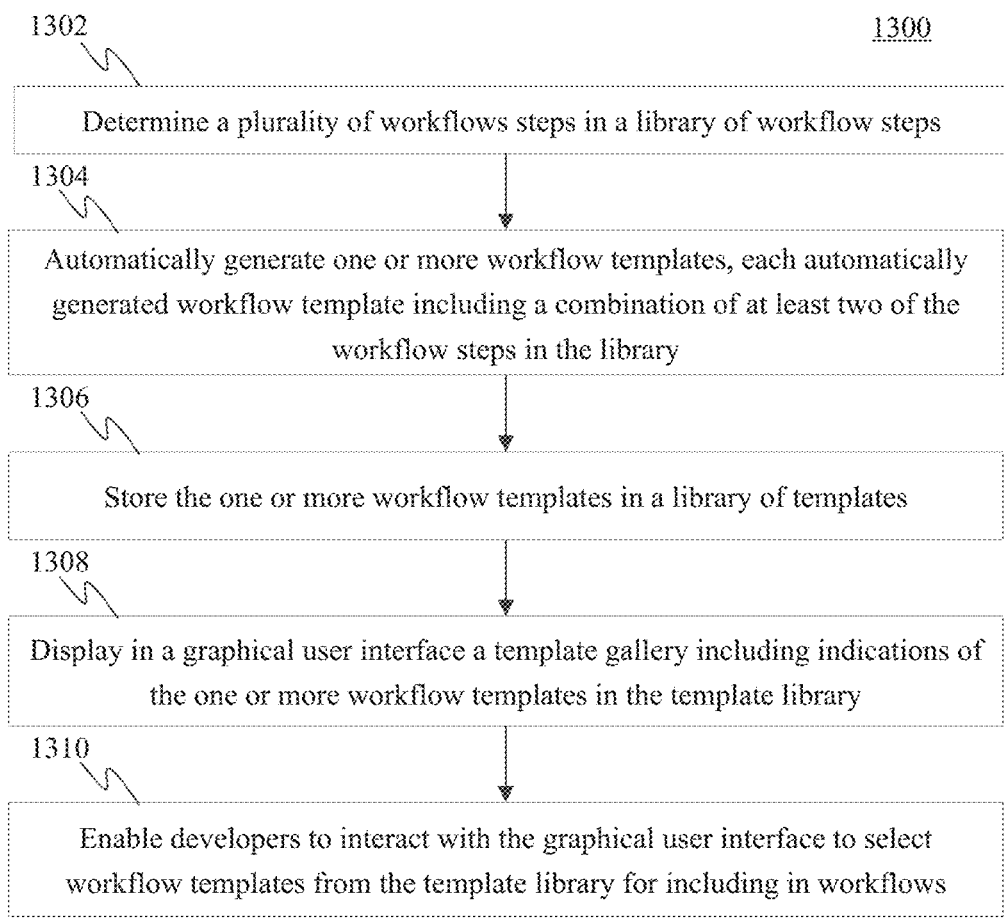
FIG. 13 shows a flowchart providing a process for automatically generating workflow templates, according to an example embodiment.

Template generation logic 1202 is described in further detail as follows with respect to FIG. 13. FIG. 13 shows a flowchart 1300 providing a process for automatically generating workflow templates, according to an example embodiment. In an embodiment, template generation logic 1202 may operate according to flowchart 1300. Note that not all steps of flowchart 1300 need to be performed in all embodiments. Template generation logic 1202 and flowchart 1300 are described as follows.

Flowchart 1300 begins with step 1302. In step 1302, a plurality of workflow steps in a library of workflow steps is determined. In an embodiment, workflow step combiner 1206 of FIG. 12 is configured to access workflow library 118 (and/or other library that contains workflow steps) to determine a plurality of workflow steps contained within. Workflow step combiner 1206 may determine all of the workflow steps in the library, or may determine a portion thereof based on filter criteria configured by a developer/administrator (e.g., filtering out particular types of workflow steps, such as messaging steps, file monitoring steps, alerting steps, etc.). Any number and combination of types of workflow steps may be determined, including one or more trigger steps and/or action steps. Generally, a trigger step of a workflow monitors for a condition, and when the condition is met, the trigger step triggers (activates or enables) one or more following workflow steps. An action step performs an action when reached in a workflow, such as following another action step, or when triggered by a trigger step. A condition step may be considered a trigger step or an action step, depending on the particular condition step and the situation.

In step 1304, one or more workflow templates are automatically generated, each automatically generated workflow template including a combination of at least two of the workflow steps in the library. In an embodiment, workflow step combiner 1206 receives workflow steps 1214 from workflow library 118. Workflow steps 1214 includes the workflow steps determined in step 1302. Workflow step combiner 1206 is configured to automatically generate one or more workflow templates 1216 by combining workflow steps received in workflow steps 1214. Workflow step combiner 1206 may combine the workflow steps in any manner to generate any number of workflow templates 1216, in a similar manner as combining workflow steps to generate workflows as described further above with respect to FIGS. 1-8.

Figure 14:
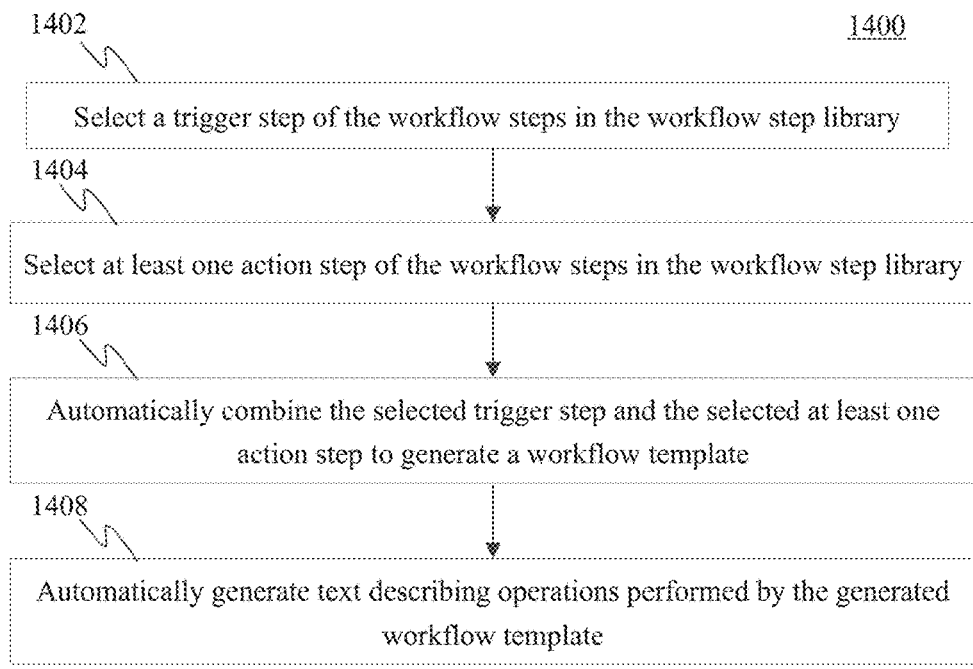
FIG. 14 shows a flowchart providing a process for combining a trigger step with one or more actions steps to generate a workflow template, according to an example embodiment.

FIG. 14 shows a flowchart 1400 providing a process for combining a trigger step with one or more actions steps to generate a workflow template, according to an example embodiment. Workflow step combiner 1206 may operate according to flowchart 1400 in an embodiment. Flowchart 1400 is described as follows.

In step 1402, a trigger step of the workflow steps in the workflow step library is selected. In an embodiment, workflow step combiner 1206 may select a trigger step of workflow steps 1214. The particular trigger step may be selected in any manner, including by being the next trigger step in a particular order (e.g., ordered by step identifiers assigned to workflow steps), randomly, according to a selection algorithm, or in any other manner. In one example, the selected trigger step may be a table monitoring workflow step that monitor when a row is added to a table. For example, the trigger step may be implemented in Google Sheets™.

In step 1404, at least one action step of the workflow steps in the workflow step library is selected. In an embodiment, workflow step combiner 1206 may select one or more action steps of workflow steps 1214. The particular action step(s) may be selected in any manner, including by being the next action step(s) in a particular order (e.g., ordered by step identifiers assigned to workflow steps), randomly, according to a selection algorithm, or in any other manner. Continuing the example, the selected action step may be a messaging workflow step that transmits a message. For example, the action step may be implemented in a text messaging application.

In step 1406, the selected trigger step and the selected at least one action step are automatically combined to generate a workflow template. In an embodiment, workflow step combiner 1206 may automatically (e.g., without human intervention) combine the selected trigger step with the one or more selected action steps into an interconnected workflow. The trigger step may be configured by workflow step combiner 1206 as the initiating step, having one or more outputs (e.g., a trigger signal, etc.) that flow into the one or more action steps, triggering the one or more action steps into action when the trigger step is triggered. When multiple action steps are present, the action steps may be configured to operate in series, parallel, or a combination thereof. Continuing the above example, workflow step combiner 1206 may combine the selected table monitoring workflow step with the selected messaging workflow step, in this particular example, combining the Google Sheets™ application workflow step with the text messaging application workflow step. Workflow step combiner 1206 may configure the Google Sheets™ workflow step to trigger the text messaging workflow step, such that when a new row is added to a table in Google Sheets™, the text messaging workflow step is triggered to send a text message to notify a recipient of the row being added.

Note that when generating a workflow template 1216, workflow step combiner 1206 may or may not generate the workflow template 1216 in a generic or anonymized manner. For instance, when anonymizing, workflow step combiner 1206 may generate workflow template 1216 to not include parameter values (or genericized parameter values) for at least some parameters. In the above example, workflow step combiner 1206 may erase or otherwise genericize parameters values for the row monitored by the Google Sheets™ workflow step and/or for the recipient(s) of the text message transmitted by the text messaging workflow step. Such parameter values may be later filled in by a user (as described further above) when such user selects (e.g., makes a copy of) workflow template 1216 to convert into an actual workflow. Further description on anonymizing workflow templates is described further below in a later subsection.

In an embodiment, workflow step combiner 1206 may access or be configured similarly to workflow logic generator 112 (FIG. 1) to generate workflow template 1216 in the form of workflow logic 120 (without at least some parameter values, as described above). For example, workflow step combiner 1206 may generate workflow template 1216 in various forms, such as in the form of a package that includes at least two components (e.g., files): workflow definition information 316 and interface definition information 318 (FIG. 3). As described above, workflow definition information 316 includes information that defines the sequence and operation of the workflow of workflow logic (e.g., lists the workflow step operations and their ordering/sequencing) and includes the parameter values for the workflow. Furthermore, as described above, interface definition information 318 includes information that defines the interfaces/parameters (e.g., inputs and outputs) of the workflow steps of a workflow. When generating workflow 1216, workflow step combiner 1206 generates workflow definition information 316 to include the information that defines the sequence and operation of the workflow template, and generates interface definition information 318 to include information that defines the interfaces/parameters (e.g., inputs and outputs) of the workflow steps of the workflow template, while leaving out or replacing parameter values for any anonymized parameters, as described above.

Referring back to FIG. 14, in step 1408, text describing operations performed by the generated workflow template is automatically generated. In an embodiment, description generator 1208 is present, and receives workflow template 1216. Description generator 1208 is configured to automatically generate text describing the operations performed by workflow template 1216, and to include the generated text (e.g., as a parameter value for a workflow template "title" or "name" parameter) with the workflow template 1216, thereby generating labeled workflow template 1218. The generated text may be used in various ways, including being displayed on an icon representing a workflow template, such as shown in FIG. 11, for example.

For example, description generator 1208 may automatically generate the text "When you save a file in Office 365, upload to SharePoint" for a workflow template that triggers a file upload to SharePoint when a file is saved in Office 365. Description generator 1208 may generate the text in any manner, including by determining names or labels for the workflow steps being combined into the workflow template (e.g., from "title" or "name" parameters of the workflow steps), and combining the determined names or labels of the workflow steps into the text. Continuing the example above, description generator 1208 may automatically generate the text "Send a text when new row is added in Google Sheets," and save the generated text as a name or label for the workflow template.

Figure 15:
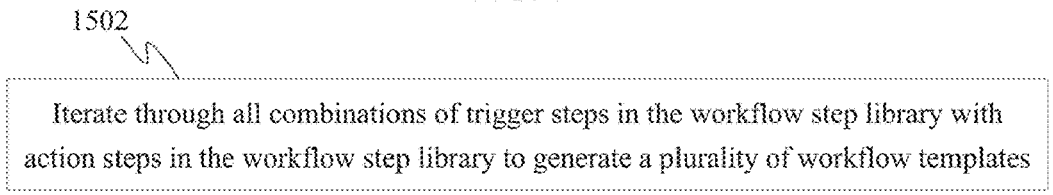
FIG. 15 shows a process for automatically generating all combinations of workflow templates based on a set of workflow steps, according to an example embodiment.
Figure 16:
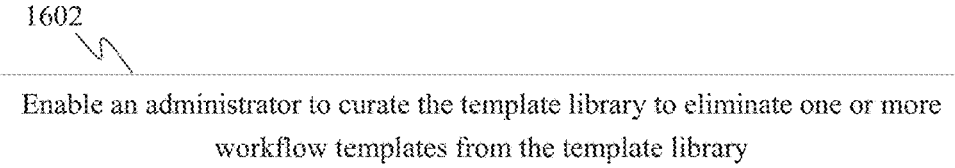
FIG. 16 shows a process for reducing a number of automatically generated workflow templates, according to an example embodiment.
Figure 17:
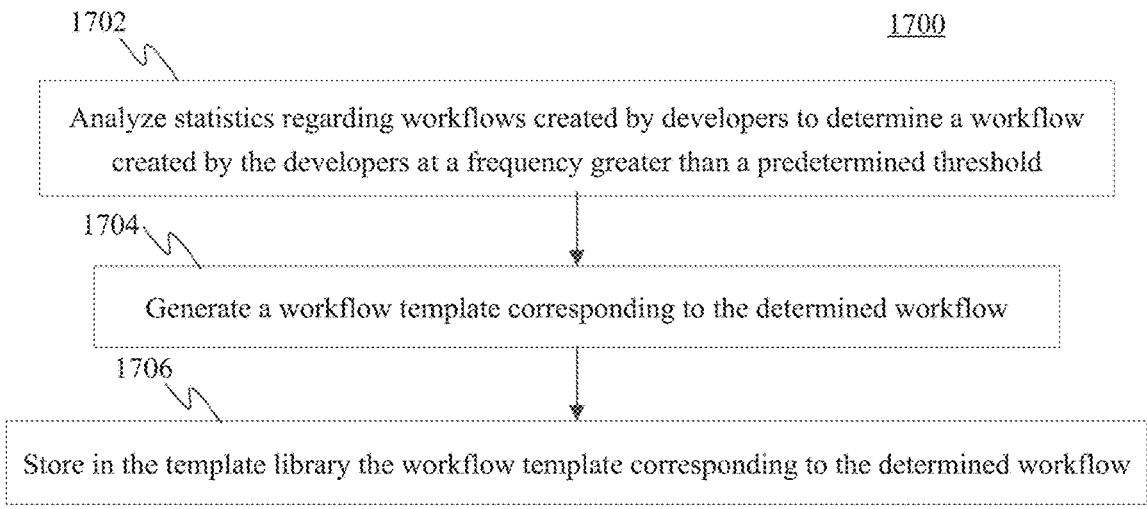
FIG. 17 shows a flowchart providing a process for automatically generating workflow templates based on usage statistics, according to an example embodiment.

Note that template generation logic 1202 may generate workflow templates according to FIG. 12 or in other manners. Furthermore, template generation logic 1202 may generate numbers of workflow templates based on the available workflow steps in various ways. FIGS. 15-17 illustrate various techniques for generating workflow templates, and are described as follows.

For instance, FIG. 15 shows a step 1502 for automatically generating all combinations of workflow templates based on a set of workflow steps, according to an example embodiment. In step 1502, all combinations of trigger steps with action steps in the workflow step library are iterated to generate a plurality of workflow templates. In an embodiment, workflow step combiner 1206 may be configured to generate a plurality of workflow templates by iterating through all combinations of trigger steps with action steps. For example, if there are ten different types of trigger steps in workflow library 118, and twelve different types of action steps in workflow library 118, workflow step combiner 1206 may generate one hundred and twenty (120) workflow templates, which includes all combinations of trigger steps and action steps. In a further embodiment, workflow step combiner 1206 may be configured to generate a plurality of workflow templates by iterating through all combinations of trigger steps with all combinations of pairs of actions action steps, or greater numbers of actions steps. Thus, according to step 1502, large numbers or workflow templates may be generated, some of which may contain useful combinations of workflow steps, while others may not contain useful combinations of workflow steps. In such manner, a large number of workflow templates may be generated, though a workflow template gallery may potentially be cluttered with large numbers of un-useful workflow templates, which may be undesirable to developers who access the gallery.

FIG. 16 shows a step 1602 for reducing a number of automatically generated workflow templates, according to an example embodiment. Step 1602 may be used to pare down the number of workflow templates generated in step 1502 of FIG. 15. In step 1602, an administrator is enabled to curate the template library to eliminate one or more workflow templates from the template library. In an embodiment, an administrator may access template library 1212 to view and delete workflow templates that the administrator deems not useful. For example, interactive display screen 1102 (FIG. 11) provided by workflow designer GUI 116 may be displayed to the administrator to show the workflow templates in template library 1212. The administrator may have administrator privileges with respect to template library 1212, enabling the administrator to select and delete workflow templates. For instance, the administrator may read the labels of the workflow templates to inform the administrator of their contents, and may use this information to delete workflow templates the administrator deems to lack usefulness. In this manner, a displayed workflow template gallery will not be cluttered with workflow templates that are not likely to be desired by users.

In other embodiments, workflow templates may be generated automatically in a more intelligent fashion. For instance, FIG. 17 shows a flowchart 1700 providing a process for automatically generating workflow templates based on usage statistics, according to an example embodiment. Flowchart 1700 begins with step 1702. In step 1702, statistics regarding workflows created by developers are analyzed to determine a workflow created by the developers in numbers or at a frequency greater than a predetermined threshold. In an embodiment, workflow steps in workflow library 118 may be available to many developers for inclusion in workflows. Usage analyzer 1210 is configured to receive usage statistics 1220 associated with workflow library 118. Usage statistics 1220 may include information on accesses of workflow steps in workflow library 118, including numbers of times each workflow step is incorporated into a workflow by a developer, numbers of times users combine particular workflow steps together in workflow, and/or further information regarding access of workflow steps in workflow library 118. Usage analyzer 1210 analyzes usage statistics 1220 to determine relatively popular combinations of workflow steps in workflows, which may be advantageously formed into workflow templates. As a result, users may be enabled to select from template library 1212 the workflow templates containing relatively popular combinations of workflow steps, rather than the users having to assemble those workflow step combinations themselves.

For example, usage analyzer 1210 may compare a number of times each particular workflow step combination (e.g., a particular trigger step interconnected with one or more particular action steps) is formed into a workflow occurs against a predetermined threshold value. The predetermined threshold value may be a minimum number of times a particular workflow step combination has to occur to be considered to be popular. Usage analyzer 1210 may generate a popular workflow indication 1222 to indicate one or more workflows that contain workflow step combinations occurring at greater number of times than the predetermined threshold.

In step 1704, a workflow template corresponding to the determined workflow is generated. As shown in FIG. 12, workflow step combiner 1206 receives popular workflow indication 1222 (when usage analyzer 1210 is present). Workflow step combiner 1206 is configured to generate a workflow template 1216 that includes the combination of workflow steps indicated in popular workflow indication 1222. Workflow step combiner 1206 may generate the workflow template as described herein.

In step 1706, the workflow template corresponding to the determined workflow is stored in the template library. As shown in FIG. 12, description generator 1208 may generate a label for workflow template 1216, and store labeled workflow template 1218 in a template library 1212, or workflow step combiner 1206 may store workflow template 1216 directly in template library 1212.

Further ways for determining which workflow templates to generate and store in template library 1212 will be apparent to persons skilled in the relevant art(s) based on the teachings herein.

Referring back to FIG. 13, in step 1306, the one or more workflow templates are stored in a library of templates. As shown in FIG. 12, description generator 1208 may store labeled workflow template 1218 in a template library 1212. Alternatively, in an embodiment where description generator 1208 is not present, workflow step combiner 1206 may store workflow template 1216 directly in template library 1212. Template library 1212 is a library of workflow templates, containing any number of workflow templates.

In step 1308, a template gallery is displayed in a graphical user interface including indications of the one or more workflow templates in the template library. In an embodiment, template gallery generator 304 (FIG. 3) may access template library 1212 for workflow templates to display in workflow designer GUI 116. As described above, FIG. 11 depicts an example interactive display screen 1102 of workflow designer GUI 116 via which one or more manually-generated or automatically-generated templates may be presented. As shown in FIG. 11, a plurality of workflow template indications is shown, including workflow template indications 1104A-1104C. Each workflow template indication is represented by an icon and by a text description of the functionality of the corresponding workflow template.

In step 1310, developers are enabled to interact with the graphical user interface to select workflow templates from the template library for including in workflows. In an embodiment, a developer may select one of the workflow templates of FIG. 11 (indicated as workflow templates 1104A-1104C, etc.) for inclusion in their workflow, and may proceed with configuring the contents of the workflow template, and/or may add additional workflow steps to the workflow steps of the workflow template to generate a more complex workflow.

IV. Generation of Templates Based Upon Selected Pre-Generated Trigger Steps

As described in the prior section, workflow templates may be generated in various ways, including by iterating through all combinations of available workflow steps (e.g., trigger steps and action steps), enabling an administrator to curate a set of generated workflow templates, generating workflow templates based on usage statistics, etc. In another embodiment, when a developer (or administrator) selects a workflow step, a selection of workflow steps compatible with the workflow step may be automatically determined and displayed. The administrator may select one or more of the automatically displayed workflow steps to be combined with the initially selected workflow step to create a workflow template. The automatic display of compatible workflow steps helps the developer avoid trial and error selection of incompatible workflow steps until a compatible workflow step is selected, instead making sure that only compatible workflow steps are displayed to the developer for selection. The resulting workflow template may be stored in workflow library 118 (FIG. 1) or elsewhere, to be made available to developers for inclusion in their workflows.

Figure 18:
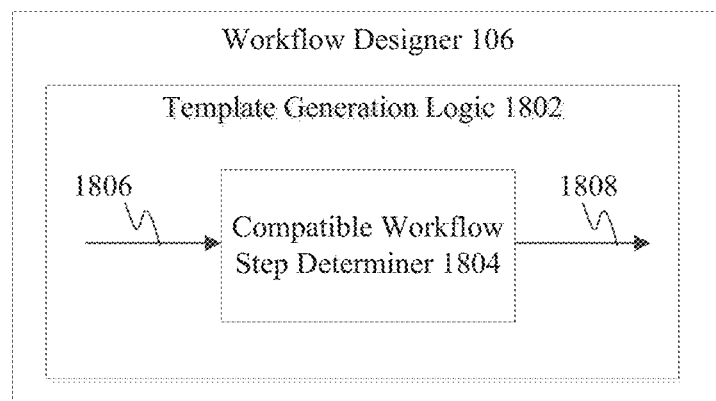
FIG. 18 shows a block diagram of a workflow designer containing template generation logic configured to determine compatible workflow steps for use in a workflow template, according to an example embodiment.

For example, FIG. 18 shows a block diagram of a workflow designer 106 containing template generation logic configured to determine compatible workflow steps, according to an embodiment. As shown in FIG. 18, workflow designer 106 includes template generation logic 1802. Template generation logic 1802 is configured generate workflow templates based on compatible workflow steps. As shown in FIG. 18, template generation logic 1802 includes a compatible workflow step determiner 1804. Compatible workflow step determiner 1804 is configured to assist in generating workflow templates by automatically determining workflow steps compatible to selected workflow steps.

Figure 19:
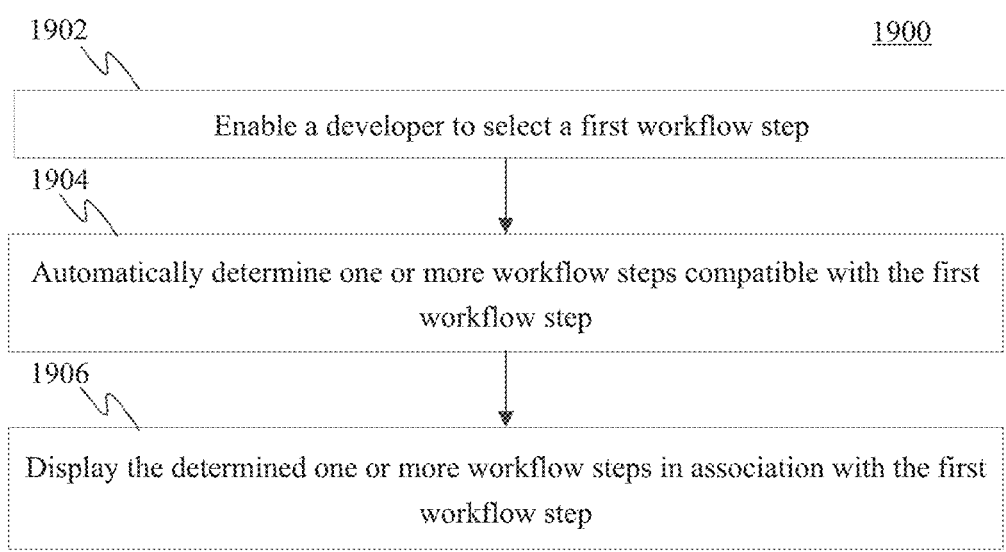
FIG. 19 shows a flowchart providing a process for automatically determining compatible workflow steps for use in a workflow template, according to an example embodiment.

Template generation logic 1802 is described in further detail as follows with respect to FIG. 19. FIG. 19 shows a flowchart 1900 providing a process for automatically determining compatible workflow steps, according to an example embodiment. In an embodiment, template generation logic 1802 may operate according to flowchart 1900. Note that not all steps of flowchart 1900 need to be performed in all embodiments. Template generation logic 1802 and flowchart 1900 are described as follows.

Figure 20:
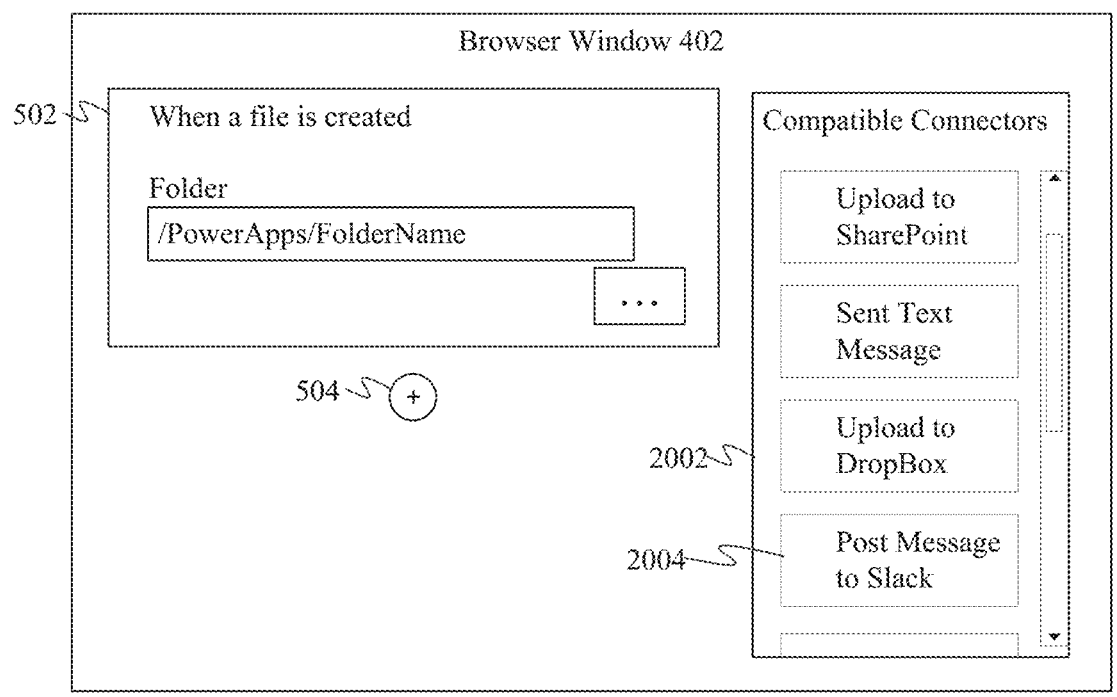
FIG. 20 shows a view of a graphical user interface for developing workflows where a set of workflow steps compatible with a first workflow step is displayed, according to an example embodiment.

Flowchart 1900 begins with step 1902. In step 1902, a developer (or administrator) is enabled to select a first workflow step. As described further above with respect to step 204 of flowchart 200 (FIG. 2) and UI generator 110 (e.g., step selector 308 of FIG. 3), developers may interact with a user interface to select workflow steps for inclusion in a workflow. For instance, FIG. 20 shows a view of browser window 402, which as described above, is an example GUI for developing workflows. In FIG. 20, a developer may have selected workflow step 502 to be a step in a workflow being developed.

In step 1904, one or more workflow steps compatible with the first workflow step are automatically determined. As shown in FIG. 18, compatible workflow step determiner 1804 receives a selected step indication 1806, which indicates the workflow step selected in step 1902. In an embodiment, compatible workflow step determiner 1804 is configured to automatically determine one or more workflow steps compatible with the workflow step indicated by selected step indication 1806. Compatible workflow step determiner 1804 may determine one or more workflow steps compatible with a workflow step indicated as selected by a user in various ways.

Figure 21:
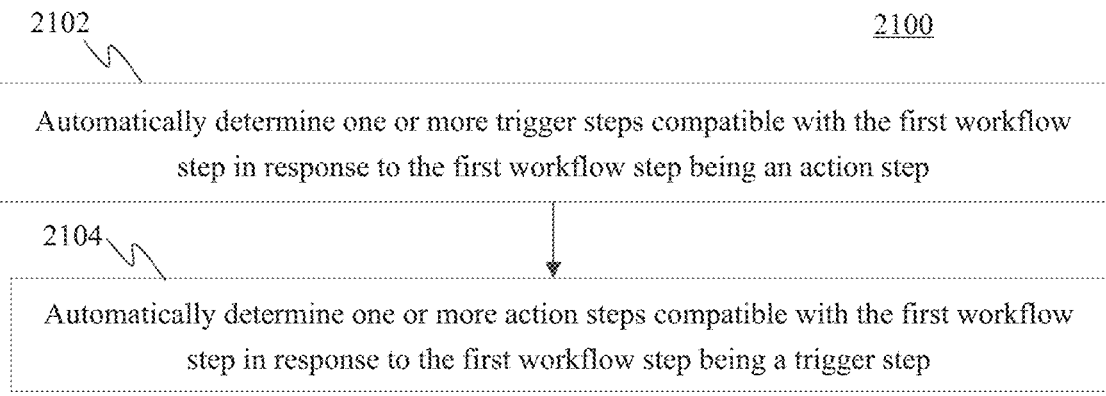
FIG. 21 shows a flowchart providing a process for selecting determining trigger steps and action steps that are compatible with each other according to an example embodiment.

For instance, in an embodiment, compatible workflow step determiner 1804 may operate according to flowchart 2100. FIG. 21 shows a flowchart 2100 providing a process for determining trigger steps and action steps that are compatible with each other according to an example embodiment. Flowchart 2100 is described as follows.

In step 2102, one or more trigger steps compatible with the first workflow step are automatically determined in response to the first workflow step being an action step. In an embodiment, compatible workflow step determiner 1804 determines what type of workflow step was indicated as selected (e.g., based on a parameter of the selected workflow step, based on lists of types of workflow steps, etc.). When the selected workflow step is determined to be an action step, compatible workflow step determiner 1804 may be configured to automatically determine one or more trigger steps compatible with the action step. Alternatively, compatible workflow step determiner 1804 may automatically determine one or more action steps compatible with the action step, or a combination of triggers steps and action steps compatible with the action step.

In step 2104, one or more action steps compatible with the first workflow step are automatically determined in response to the first workflow step being a trigger step. When the selected workflow step is determined to be a trigger step, compatible workflow step determiner 1804 may be configured to automatically determine one or more action steps compatible with the trigger step. Alternatively, compatible workflow step determiner 1804 may automatically determine one or more trigger steps compatible with the trigger step, or a combination of triggers steps and action steps compatible with the trigger step.

Compatible workflow step determiner 1804 may be configured to determine workflow steps compatible with a selected workflow step in various ways. For instance, in one embodiment, compatible workflow step determiner 1804 may maintain of list of all workflow steps available, and for each listed workflow step, may indicate all available workflow steps compatible with the listed workflow step. Each workflow step may be indicated as "trigger" or "action" step, if desired to only select compatible trigger steps or action steps. In another embodiment, compatible workflow step determiner 1804 may access usage statistics 1220 (FIG. 12) to determine workflow steps combined with each other by users in their workflows, and may categorize workflow steps combined with each other in user workflows as being compatible with each other. In other embodiments, compatible workflow step determiner 1804 may determine compatible workflow steps in other ways.

Referring back to FIG. 19, in step 1906, the determined one or more workflow steps are displayed in association with the first workflow step. In an embodiment, UI generator 110 (FIG. 1) may be configured to display the compatible workflow steps determined in step 1904 in association with the workflow step selected in step 1902. The determined compatible workflow steps may be displayed in association with the selected workflow step in any manner, including being displayed to the left, right, top, or bottom of the selected step, in a pull down menu, or in any other manner in association with the selected workflow step. Alternatively, a workflow step gallery generated by workflow step gallery generator 302 (FIG. 3) may be displayed on the same page or a new page.

For example, as shown in FIG. 20, the developer selected workflow step 502 for inclusion in a workflow, and in response, a compatible connector selector 2002 may be displayed adjacent to workflow step 502 (to the right in FIG. 20) that includes a plurality of workflow steps determined to be compatible with workflow step 502. Compatible connector selector 2002 may provide a scrollable list, particularly when the number of determined compatible workflow steps does not fit on one page, or may display the compatible workflow steps in another manner.

Figure 22:
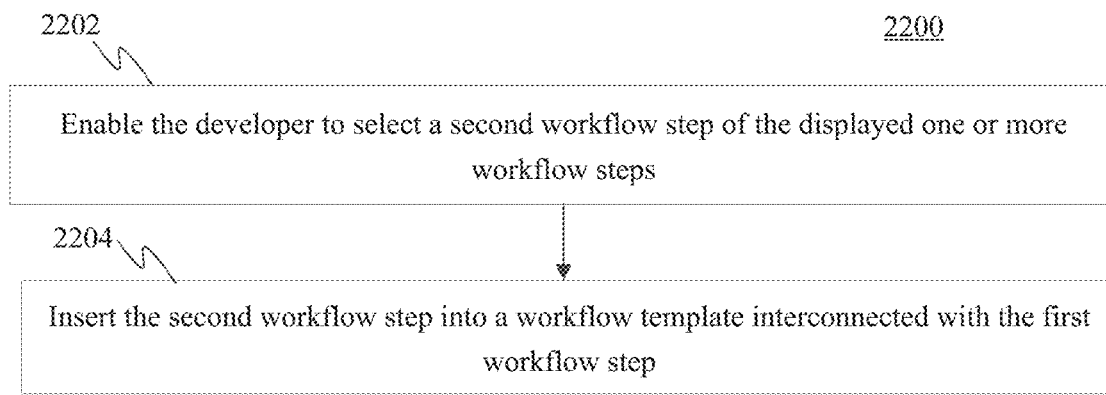
FIG. 22 shows a flowchart providing a process for selecting a compatible workflow step for inclusion in a workflow template, according to an example embodiment.

Once the compatible workflow steps are displayed, the developer (or administrator) may be enabled to select one or more of them for incorporation into a workflow template. In particular, FIG. 22 shows a flowchart 2200 providing a process for selecting a compatible workflow step for inclusion in a workflow template, according to an example embodiment. In an embodiment, flowchart 2200 may be a continuation of flowchart 1900. Flowchart 2200 is described as follows.

In step 2202, the developer is enabled to select a second workflow step of the displayed one or more workflow steps. In an embodiment, step selector 308 (or other mechanism for selecting workflow steps) may enable the developer to select a workflow step from the displayed compatible workflow steps in any manner described elsewhere herein or otherwise known. For instance, with respect to FIG. 20, the developer may scroll through compatible workflow steps displayed by compatible connector selector 2002.

In step 2204, the second workflow step is inserted into a workflow template interconnected with the first workflow step. In an embodiment, step selector 308 (or other mechanism for selecting workflow steps) may insert the selected workflow step into the workflow template with the first workflow step selected in step 1902 in any manner described elsewhere herein or otherwise known. For instance, with respect to FIG. 20, the developer may have selected (in step 1902 of flowchart 1900) workflow step 2004 displayed by compatible connector selector 2002 by clicking on workflow step 2004 with a mouse pointer or in any other manner. Step selector 308 may incorporate selected workflow step 2004 into a workflow template with workflow step 502. A label may be generated for the workflow template (e.g., "When a file is created, post a message to Slack"), and the workflow template may be saved, as described elsewhere herein.

Note that upon inclusion of one of the compatible workflow steps in a workflow, in an embodiment, compatible workflow step determiner 1804 may determine and display another list of compatible workflow steps, this time being determined for the just included workflow step according to flowchart 1900. Another compatible workflow step may be incorporated into the workflow in this manner, as well as even further compatible workflow steps.

V. Selective Anonymization of Automated Workflow Templates for Private and Public Sharing In an embodiment, template generation logic 1202 and 1802 of FIGS. 12 and 18 are configured to allow a user to publish automated workflow templates to sites where they can be accessed by developers. As noted above, a template comprises a pre-generated user-configurable automated workflow. By allowing a user to publish a developed/completed automated workflow as a template, template generation logics 1202 and 1802 advantageously enable users to leverage the work of others in their community to identify automated workflows that may be useful to them and that can be used as a starting point for developing their own automated workflows.

Figure 23:
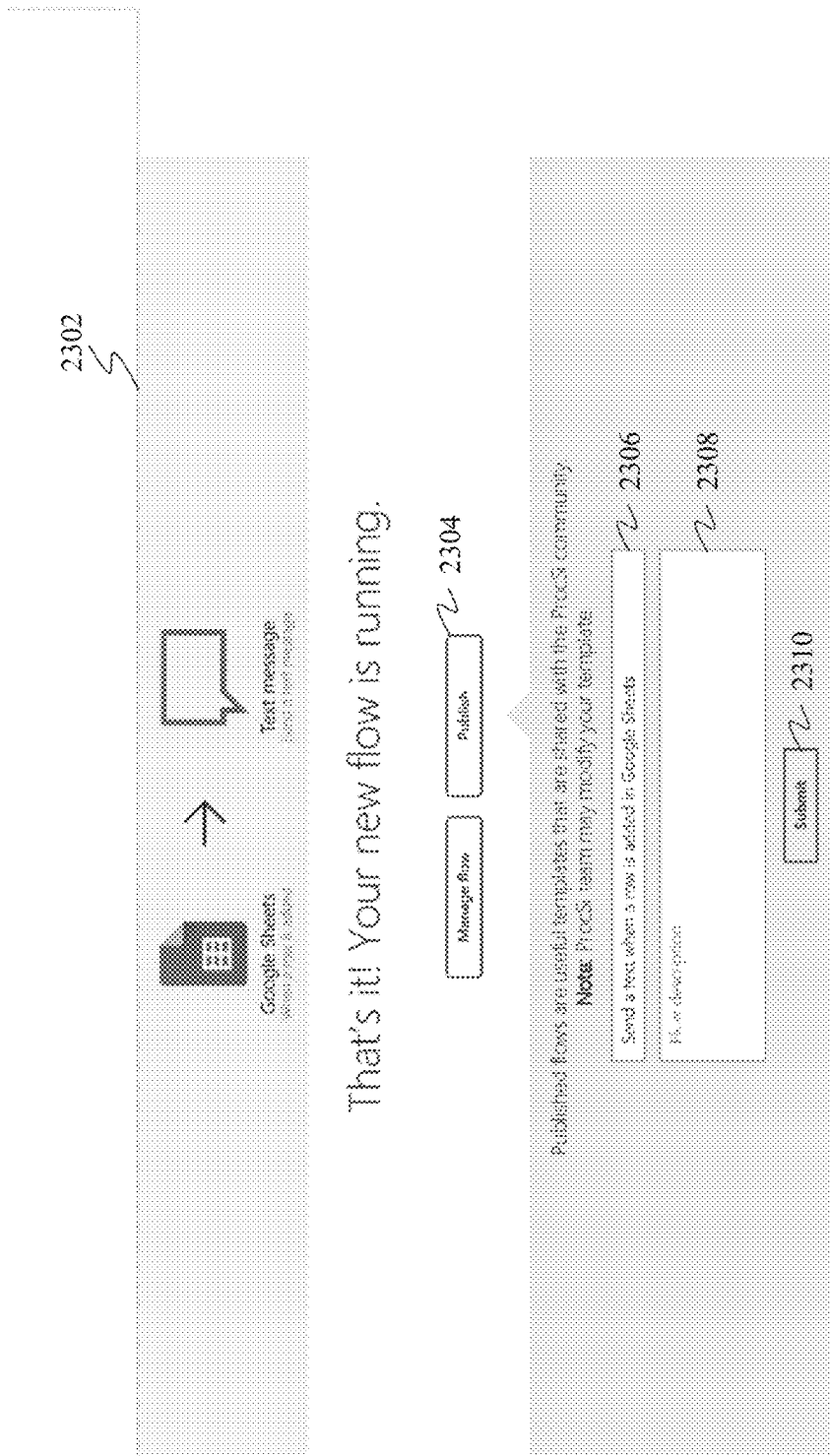
FIG. 23 depicts an example interactive display screen of an automated workflow development application that enables a user to publish a completed workflow application as a template, according to an example embodiment.

FIG. 23 depicts an example interactive display screen 2302 of an automated workflow development application (e.g., workflow designer 106 of FIG. 1) that enables a user to publish a completed workflow application as a template. As shown in FIG. 23, screen 2302 includes an interactive element 2304 (e.g., a button) that a user may interact with to publish a developed/completed automated workflow as a template. As further shown in screen 2302, the user may also be presented with a first text entry box 2306 into which the user may type a name of the template ("Send a text when a row is added in Google Sheets") (rather than being generated automatically, as described above) and a second text entry box 2308 into which the user may type a more extensive description of the automated workflow. In this example, the user may select an interactive element 2310 (e.g., a button) to submit the text entered into text entry boxes 2306 and 2308 to be associated with the workflow template.

In some embodiments, the user may selectively share the workflow template with the entire public (e.g., by publishing the template to a general population of users via the Internet) or may selectively share the template privately (e.g., by publishing the template to a population of users within a private organization, such as an enterprise or sharing the template with a target user or users). Depending on the audience to whom the template is published, various parameters associated within the template may or may not need to be anonymized.

For example, as described above, FIG. 6 shows a workflow step 502 of an automated workflow under development. Workflow step 502 is included in the workflow under further development in FIG. 6, the workflow including a series of steps, wherein each step has one or more user-configurable parameters associated therewith. As shown in FIG. 6, workflow step 502 includes a parameter of a folder name shown as /PowerApps/FolderName. If this automated workflow were to be shared as a template with other users within the same private organization, then it might make sense to include the same folder name of /PowerApps/FolderName within the template. However, if this automated workflow were to be shared as a template with users outside of the enterprise, then it might make more sense to remove the particular folder name (i.e., to anonymize the parameter) since that folder name will have no relevance to users outside the enterprise, may not be accessible by users outside the enterprise, and/or may include private information not desired to be divulged outside of the organization.

Other examples of parameters in an automated workflow that might need to be anonymized when publishing outside of an organization might include, for example, an identifier of a particular database, an identifier of a particular connection, an identifier of a particular account, as well as credentials or other information that may be used to access such a database, connection or account. As such, a workflow designer may be configured to enable parameter values to be anonymized for any of these reasons, as well as other reasons that would be apparent to persons skilled in the relevant art(s).

Figure 24:
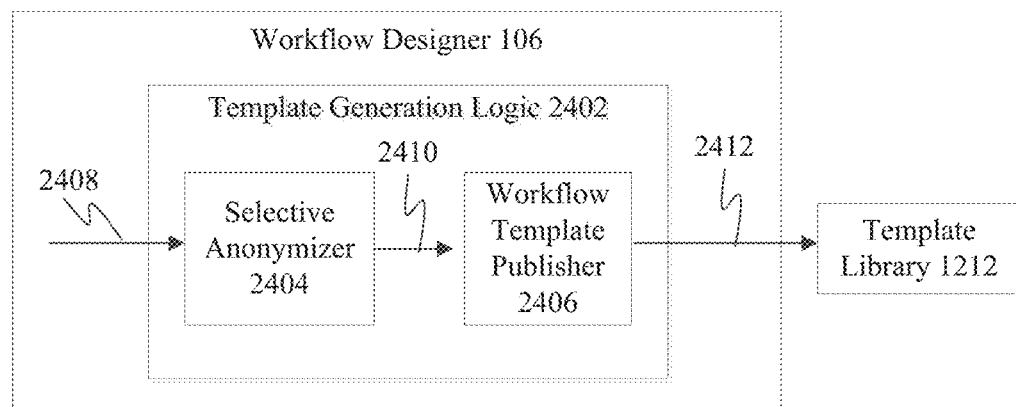
FIG. 24 is a block diagram of a workflow designer configured to selectively anonymize templates for public and private sharing in accordance with an embodiment.

Accordingly, FIG. 24 is a block diagram of workflow designer 106 configured to selectively anonymize templates for public and private sharing in accordance with an embodiment. As shown in FIG. 24, workflow designer 106 includes template generation logic 2402. Template generation logic 2402 includes a workflow template publisher 2406 that receives an automated workflow to be published as a template and then publishes such template. As further shown in FIG. 24, template generation logic 2402 further includes a selective anonymizer 2404 that selectively anonymizes certain parameters included in or referenced by the automated workflow based on one or more factors prior to publication. The one or more factors may include, for example, and without limitation, the intended target audience for publication (e.g., whether publication will be to the general public or within an organization only, whether publication will be to an entire organization or to a particular team within an organization, whether publication will be to a single individual only, etc.), the user sharing the template, the organization within which the template is being shared, and the context in which the template was built. Depending upon these factors, some connections and/or properties of an automated workflow may be anonymized and some may not prior to publication.

Figure 25:
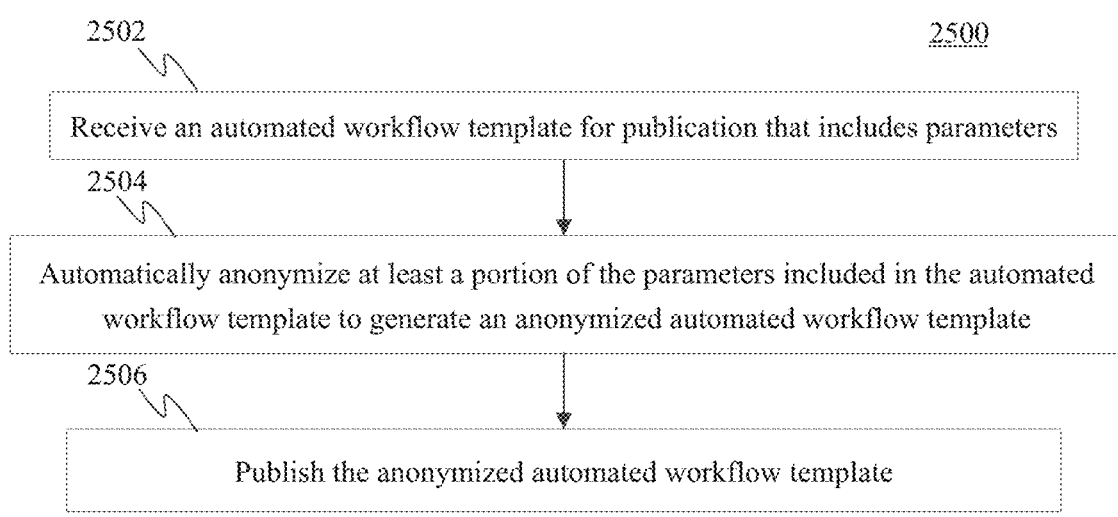
FIG. 25 shows a flowchart providing a process for anonymizing parameters in a workflow template, according to an example embodiment.

Template generation logic 2402 is described in further detail as follows with respect to FIG. 25. FIG. 25 shows a flowchart 2500 providing a process for anonymizing parameters in a workflow template, according to an example embodiment. In an embodiment, template generation logic 2402 may operate according to flowchart 2500. Note that not all steps of flowchart 2500 need to be performed in all embodiments. Template generation logic 2402 and flowchart 2500 are described as follows.

Flowchart 2500 begins with step 2502. In step 2502, an automated workflow template is received for publication that includes parameters. In embodiments, a workflow template 2408 may be generated (e.g., as described above) and received by template generation logic 2402. Workflow template 2408 may include one or more parameters having parameter values, as described above. This may be because workflow template 2408 is formed from a combination of workflow steps that had parameter values assigned. At least some of the parameter values may be desired to be anonymized prior to publication of workflow template 2408 (where workflow template 2408 is made available to a different set of users). Workflow template 2408 may be received by template generation logic 2402 to be anonymized, and thereafter published as an anonymized workflow template.

Figure 26:
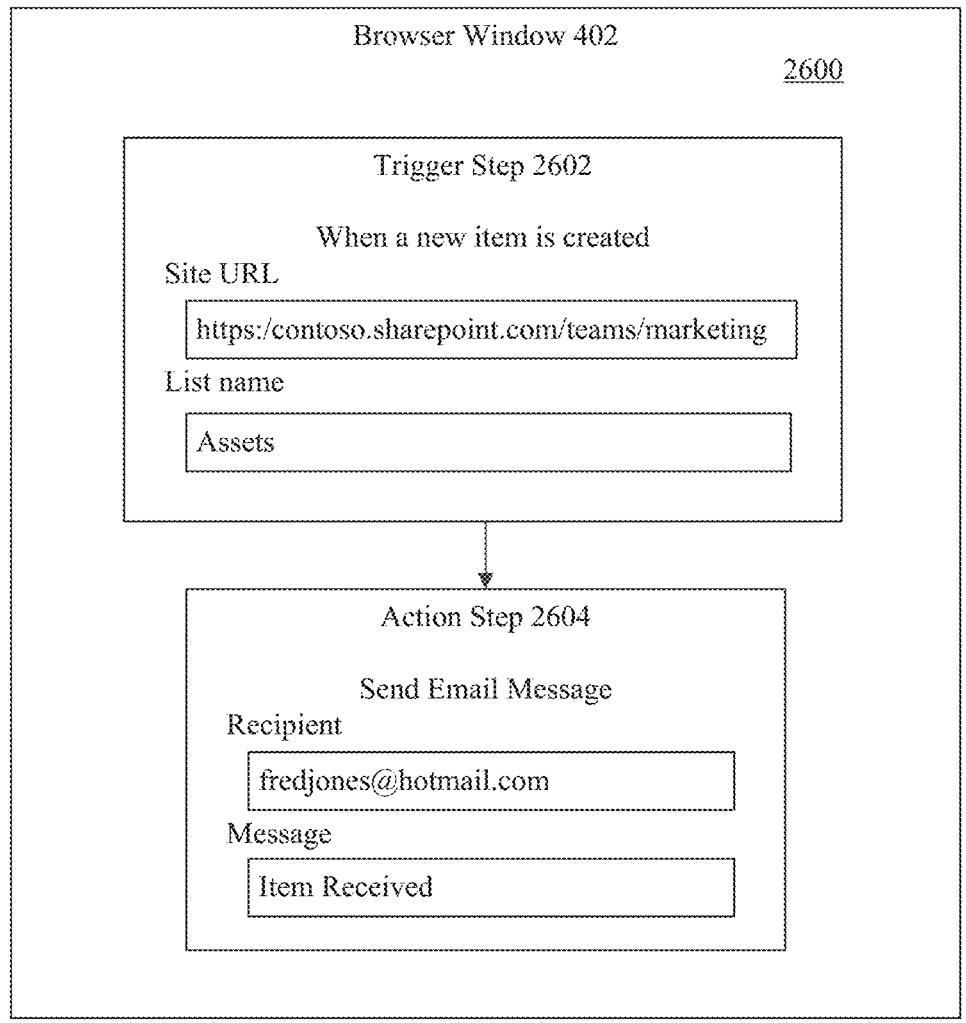
FIG. 26 shows a view of a graphical user interface for developing workflows where a workflow step includes parameters to be anonymized, according to an example embodiment.

An example workflow that may be received for publication as a workflow template is illustrated with respect to FIG. 26. FIG. 26 shows a view of a browser window 402 that includes a workflow 2600 under development, according to an example embodiment. Workflow 2600 is an automated workflow that included a series of steps, wherein each step has one or more user-configurable parameters associated therewith. One or more of the workflow steps have parameters to be anonymized.

For instance, as shown in FIG. 26, workflow 2600 includes a trigger step 2602 as a first step and an action step 2604 as a second step. Trigger step 2602 includes as parameters a site URL filed with a parameter value of "https:/contoso.sharepoint.com/teams/marketing" and a list name filled with a parameter value of "Assets." If workflow 2600 were shared as a workflow template with other users within the same private organization, then it might make sense to include the same site URL "https:/contoso.sharepoint.com/teams/marketing" within the template as the parameter value. However, if workflow 2600 were to be shared as a workflow template with users outside of the enterprise, then it might make more sense to remove the particular site URL (i.e., to anonymize the parameter) since that site URL may have no relevance to users outside the enterprise.

In step 2504, at least a portion of the parameters included in the automated workflow template are automatically anonymized to generate an anonymized automated workflow template. As shown in FIG. 24, selective anonymizer 2404 may receive workflow template 2408. In an embodiment, selective anonymizer 2404 is configured to anonymize one or more parameters in workflow template 2408, purging the parameter values or replacing the parameter values with generic values to anonymize them. In an embodiment, selective anonymizer 2404 may step through the parameters of workflow template 2408 (e.g., as stored in interface definition information 318 of FIG. 3), and selectively anonymize them, determining which parameters to anonymize, and anonymizing the parameter values of those determined parameters. As shown in FIG. 24, selective anonymizer 2404 outputs anonymized workflow template 2410, which is the anonymized form of workflow template 2408.

Figure 27:
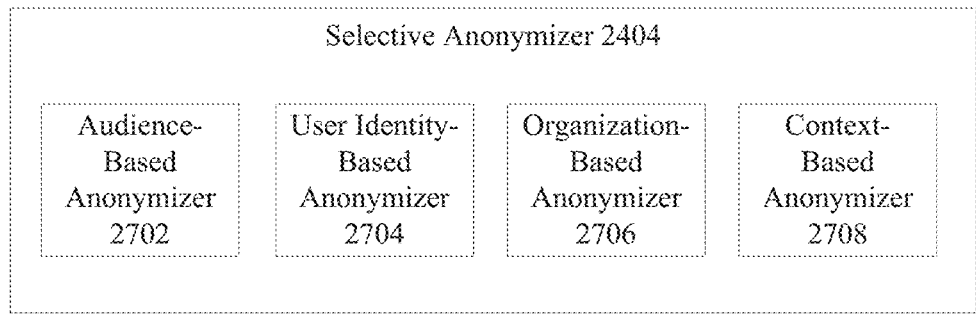
FIG. 27 is a block diagram of a selective anonymizer configured to selectively anonymize workflow templates in accordance with an embodiment.

Selective anonymizer 2404 may be configured in various ways to perform such automatic anonymizing of parameters. For instance, FIG. 27 is a block diagram of a selective anonymizer 2404 configured to selectively anonymize templates in accordance with an embodiment. As shown in FIG. 27, selective anonymizer 2404 includes an audience-based anonymizer 2702, a user identity-based anonymizer 2704, an organization-based anonymizer 2706, and a context-based anonymizer 2708. Any one or more of these components may be present in selective anonymizer 2404, in embodiments. These components of selective anonymizer 2404 are described as follows.

Audience-based anonymizer 2702 is configured to parse through the parameters of workflow template 2408, and selectively anonymize their parameter values based on the audience for publication. The audience for publication may be determined by audience-based anonymizer 2702 in various ways, including by user input, by an indication of a target publication library or folder, and/or by other mechanism. Based on this determination, audience-based anonymizer 2702 can determine or more of whether publication will be to the general public or within an organization only, whether publication will be to an entire organization or to a particular team within an organization, whether publication will be to a single individual only, etc. Accordingly, audience-based anonymizer 2702 is configured to anonymize parameters that would have no meaning or would otherwise need to be private outside of the present organization (if publication is to a different organization), that would have no meaning or would otherwise need to be private outside of the present team (if publication is to a different team within a same organization), that would have no meaning or would otherwise need to be private if being used by a different person, etc.

User identity-based anonymizer 2704 is configured to parse through the parameters of workflow template 2408, and selectively anonymize their parameter values based on an identity of a user to whom workflow template 2408 is being published. The identity of the user for publication may be determined by user identity-based anonymizer 2704 in various ways, including by user input, by an indication that a target publication library or folder is owned by the user, and/or by other mechanism. Based on this determination, user identity-based anonymizer 2704 can anonymize parameters that would have no meaning to the identified user, should not be divulged to the user, or would otherwise need to be adjusted by the user to the user's own profile (e.g., messaging identifier such as text messaging number or email address).

Organization-based anonymizer 2706 is configured to parse through the parameters of workflow template 2408, and selectively anonymize their parameter values based on an identity of an organization to which workflow template 2408 is being published. The identity of the organization for publication may be determined by organization-based anonymizer 2706 in various ways, including by user input, by an indication that a target publication library or folder is owned by the organization, and/or by other mechanism. Based on this determination, organization-based anonymizer 2706 can anonymize parameters that would have no meaning to the identified organization, should not be divulged to the organization, or would otherwise need to be adjusted by the organization to the organization's own profile (e.g., folder names, domain names, group messaging identifiers, etc.).

Context-based anonymizer 2708 is configured to parse through the parameters of workflow template 2408, and selectively anonymize their parameter values based on a context in which workflow template 2408 was created. This context may be determined by context-based anonymizer 2708 in various ways, including by user input, by a time, a place, and/or a reason for creation of workflow template 2408, and/or by other mechanism. Based on this determination, context-based anonymizer 2708 can anonymize parameters that would have no meaning outside of the identified context.

In an embodiment, all parameters are automatically analyzed by selective anonymizer 2404 to determine whether or not the parameters are to be anonymized. In another embodiment, selective anonymizer 2404 may enable a developer to select one or more of the parameters for anonymization, in addition to selective anonymizer 2404 determining whether or not the parameters are to be anonymized.

Figure 28:
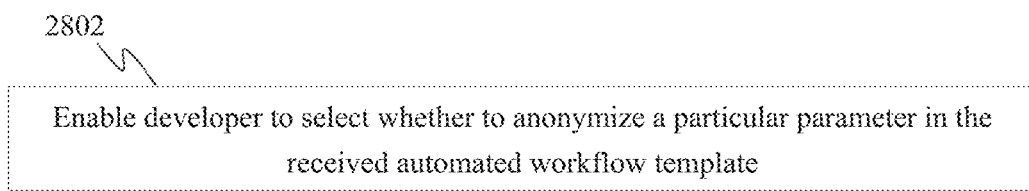
FIG. 28 shows a process for enabling a developer to select parameters for anonymization, in accordance with an embodiment.

For instance, FIG. 28 shows a step 2802 for enabling a developer to select parameters for anonymization, in accordance with an embodiment. In step 2802, a developer is enabled to select whether to anonymize a particular parameter in the received automated workflow template. In an embodiment, UI generator 110 (FIG. 1) is configured to display a user interface control (e.g., a pulldown menu, a check box, a button, etc.) to enable a developer to select whether to anonymize a parameter of workflow template 2408. If the parameter is selected by the user for anonymization, selective anonymizer 2404 is configured to anonymize the parameter (e.g., clear the parameter value, replace the parameter value with a generic parameter value, enter a message to fill in the parameter value, etc.). For example, if the parameter is a messaging account identifier (e.g., an email address), selective anonymizer 2404 may be configured to erase the current messaging account identifier, or replace it with a generic messaging account identifier.

With respect to the example of FIG. 26, selective anonymizer 2404 may be configured to anonymize the "Site URL" parameter because "https://contoso.sharepoint.com/teams/marketing" does not having meaning outside the current organization that developed workflow 2600. As such, selective anonymizer 2404 may delete or may replace "https:/ contoso.sharepoint.com/teams/marketing" with a parameter value of a generic URL or a fill-in message (e.g., "Insert URL here"). Selective anonymizer 2404 may be configured to anonymize the "List Name" parameter due to "Assets" being a confidential list of assets for the organization that developed workflow 2600. As such, selective anonymizer 2404 may delete or replace the "Assets" with a parameter value of a generic list or a fill-in message (e.g., "Insert List Name here"). Selective anonymizer 2404 may be configured to anonymize the "Recipient" parameter due to "fredjones@hotmail.com" being a personal email address for a person in the organization that developed workflow 2600. As such, selective anonymizer 2404 may delete or replace "fredjones@hotmail.com" with a parameter value of a generic message identifier or a fill-in message (e.g., "Target Recipient"). Selective anonymizer 2404 may determine that the Message parameter has a parameter value ("Item Received") that contains no confidential information and would have meaning outside of the organization, and thus does not need to be anonymized.

Figure 29:
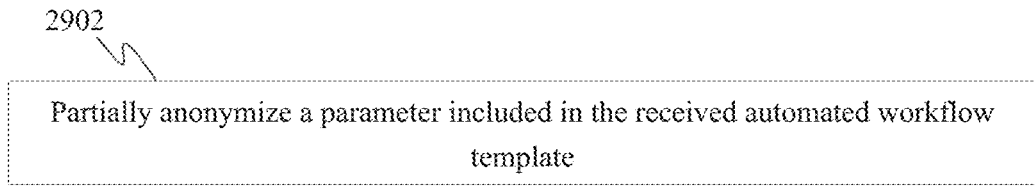
FIG. 29 shows a process for partially anonymizing parameters, in accordance with an embodiment.

Note that in some embodiments, rather than entirely deleting or replacing a parameter value, selective anonymizer 2404 may be configured to modify a parameter value in part. For example, FIG. 29 shows a step 2902 for partially anonymizing parameters, in accordance with an embodiment. In step 2902, a parameter included in the received automated workflow template is partially anonymized. In such an embodiment, selective anonymizer 2404 is configured to analyze a particular parameter, and if selective anonymizer 2404 determines the parameter is to be anonymized, selective anonymizer 2404 replaces a portion of the parameter value. For instance, selective anonymizer 2404 may modify a folder name to a different folder name or a generic folder name, may modify a messaging identifier to a different messaging identifier or generic messaging identifier, etc.

For instance, with respect to FIG. 26, selective anonymizer 2404 may modify the URL "https:/contoso.sharepoint.com/teams/marketing" to point to a site URL of a group within an organization with which the workflow template is to be shared, or to a generic URL site, in either case by modifying a portion of the parameter value. For instance, the URL may be modified to be directed from a "team" group to a "managers" group as follows: "https:/ contoso.sharepoint.com/managers/marketing", where "team" was replaced with "managers" in the file path.

Referring back to FIG. 25, in step 2506, the anonymized automated workflow template is published. As shown in FIG. 24, workflow template publisher 2406 receives anonymized workflow template 2410, which is the anonymized form of workflow template 2408. Workflow template publisher 2406 is configured to publish anonymized workflow template 2410. Workflow template publisher 2406 may publish anonymized workflow template 2410 to a folder or site designated by a user or to a default folder or site. For example, as shown in FIG. 24, workflow template publisher 2406 may publish anonymized workflow template 2410 by storing anonymized workflow template 2410 in template library 1212. Workflow template publisher 2406 may publish workflow template 1216 in various forms, such as in the form of a package including at least two components (e.g., files): workflow definition information 316 and interface definition information 318 (FIG. 3). Template library 1212 may be publicly available, or available to an organization, a team within an organization, or one or more specific individuals, and may have been anonymized correspondingly.

VI. Example Computer System Implementation

Computing device 102, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, template generation logic 1202, workflow step combiner 1206, description generator 1208, usage analyzer 1210, template generation logic 1802, compatible workflow step determiner 1804, selective anonymizer 2404, workflow template publisher 2406, audience-based anonymizer 2702, user identity-based anonymizer 2704, organization-based anonymizer 2706, context-based anonymizer 2708, flowchart 200, flowchart 1000, flowchart 1300, flowchart 1400, step 1502, step 1602, flowchart 1700, flowchart 1900, flowchart 2100, flowchart 2200, flowchart 2500, step 2802, and step 2902 may be implemented in hardware, or hardware combined with software and/or firmware. For example, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, template generation logic 1202, workflow step combiner 1206, description generator 1208, usage analyzer 1210, template generation logic 1802, compatible workflow step determiner 1804, selective anonymizer 2404, workflow template publisher 2406, audience-based anonymizer 2702, user identity-based anonymizer 2704, organization-based anonymizer 2706, context-based anonymizer 2708, flowchart 200, flowchart 1000, flowchart 1300, flowchart 1400, step 1502, step 1602, flowchart 1700, flowchart 1900, flowchart 2100, flowchart 2200, flowchart 2500, step 2802, and/or step 2902 may be implemented as computer program code/instructions configured to be executed in one or more processors and stored in a computer readable storage medium, or may be implemented as hardware logic/electrical circuitry.

For instance, in an embodiment, one or more, in any combination, of workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, template generation logic 1202, workflow step combiner 1206, description generator 1208, usage analyzer 1210, template generation logic 1802, compatible workflow step determiner 1804, selective anonymizer 2404, workflow template publisher 2406, audience-based anonymizer 2702, user identity-based anonymizer 2704, organization-based anonymizer 2706, context-based anonymizer 2708, flowchart 200, flowchart 1000, flowchart 1300, flowchart 1400, step 1502, step 1602, flowchart 1700, flowchart 1900, flowchart 2100, flowchart 2200, flowchart 2500, step 2802, and/or step 2902 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 30:
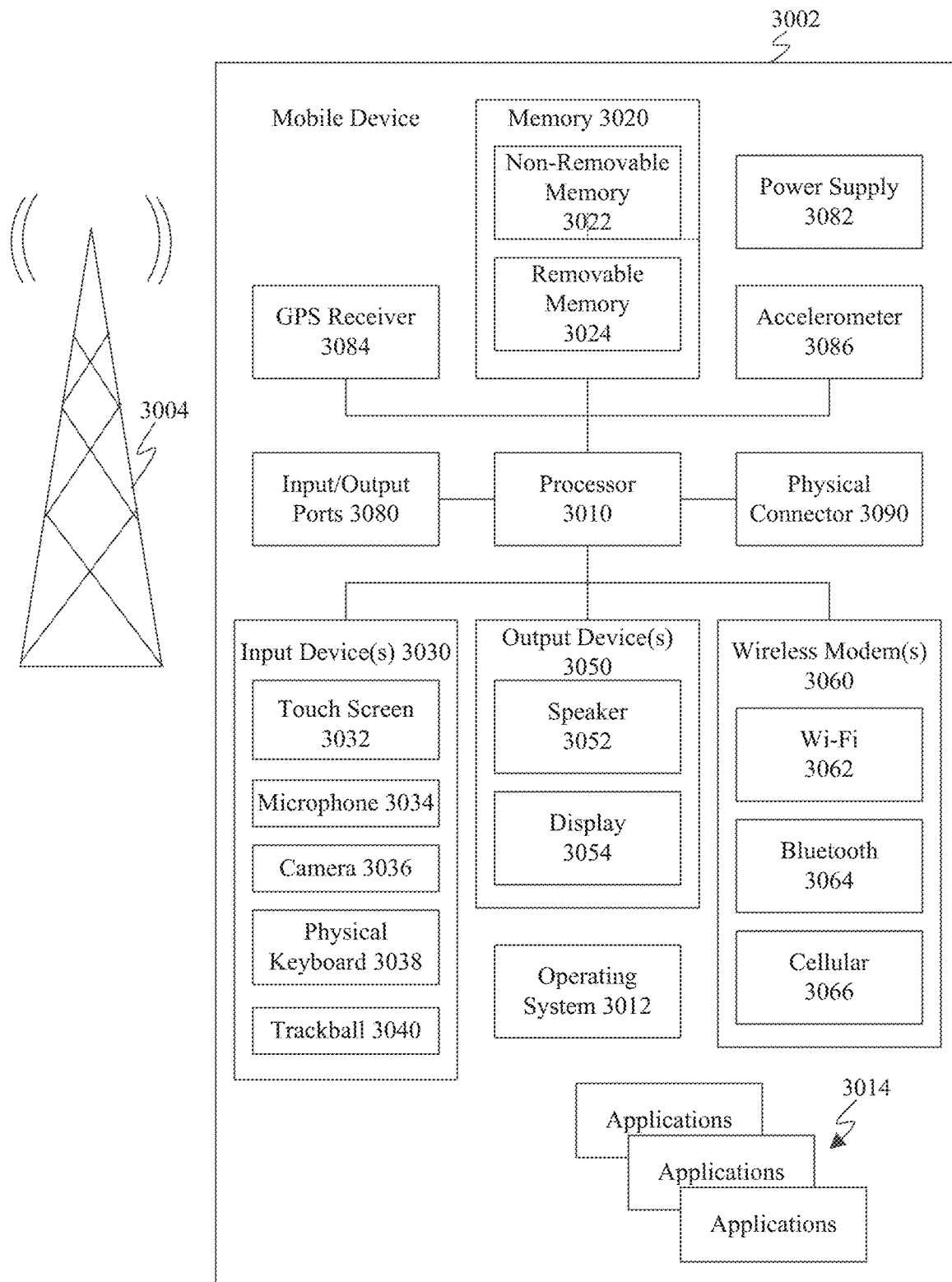
FIG. 30 is a block diagram of an example mobile device that may be used to implement various embodiments.

FIG. 30 shows a block diagram of an exemplary mobile device 3002 that may implement embodiments described herein. For example, mobile device 3002 may be used to implement computing device 102 or server 134. As shown in FIG. 30, mobile device 3002 includes a variety of optional hardware and software components. Any component in mobile device 3002 can communicate with any other component, although not all connections are shown for ease of illustration. Mobile device 3002 can be any of a variety of computing devices (e.g., cell phone, smartphone, handheld computer, Personal Digital Assistant (PDA), etc.) and can allow wireless two-way communications with one or more mobile communications networks 3004, such as a cellular or satellite network, or with a local area or wide area network.

The illustrated mobile device 3002 can include a controller or processor 3010 (e.g., signal processor, microprocessor, ASIC, or other control and processing logic circuitry) for performing such tasks as signal coding, data processing, input/output processing, power control, and/or other functions. An operating system 3012 can control the allocation and usage of the components of mobile device 3002 and provide support for one or more application programs 3014 (also referred to as "applications" or "apps"). Application programs 3014 may include common mobile computing applications (e.g., e-mail applications, calendars, contact managers, web browsers, messaging applications) and any other computing applications (e.g., word processing applications, mapping applications, media player applications).

The illustrated mobile device 3002 can include memory 3020. Memory 3020 can include non-removable memory 3022 and/or removable memory 3024. Non-removable memory 3022 can include RAM, ROM, flash memory, a hard disk, or other well-known memory devices or technologies. Removable memory 3024 can include flash memory or a Subscriber Identity Module (SIM) card, which is well known in GSM communication systems, or other well-known memory devices or technologies, such as "smart cards." Memory 3020 can be used for storing data and/or code for running operating system 3012 and applications 3014. Example data can include web pages, text, images, sound files, video data, or other data to be sent to and/or received from one or more network servers or other devices via one or more wired or wireless networks. Example code can include program code for workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, template generation logic 1202, workflow step combiner 1206, description generator 1208, usage analyzer 1210, template generation logic 1802, compatible workflow step determiner 1804, selective anonymizer 2404, workflow template publisher 2406, audience-based anonymizer 2702, user identity-based anonymizer 2704, organization-based anonymizer 2706, context-based anonymizer 2708, flowchart 200, flowchart 1000, flowchart 1300, flowchart 1400, step 1502, step 1602, flowchart 1700, flowchart 1900, flowchart 2100, flowchart 2200, flowchart 2500, step 2802, and/or step 2902 (including any suitable step of flowcharts 200, 1000, 1300, 1400, 1700, 1900, 2100, 2200, 2500), and/or further embodiments described herein. Memory 3020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 3002 can support one or more input devices 3030, such as a touch screen 3032, a microphone 3034, a camera 3036, a physical keyboard 3038 and/or a trackball 3040 and one or more output devices 3050, such as a speaker 3052 and a display 3054. Other possible output devices (not shown) can include piezoelectric or other haptic output devices. Some devices can serve more than one input/output function. For example, touch screen 3032 and display 3054 can be combined in a single input/output device. The input devices 3030 can include a Natural User Interface (NUI).

Wireless modem(s) 3060 can be coupled to antenna(s) (not shown) and can support two-way communications between the processor 3010 and external devices, as is well understood in the art. The modem(s) 3060 are shown generically and can include a cellular modem 3066 for communicating with the mobile communication network 3004 and/or other radio-based modems (e.g., Bluetooth 3064 and/or Wi-Fi 3062). At least one of the wireless modem(s) 3060 is typically configured for communication with one or more cellular networks, such as a GSM network for data and voice communications within a single cellular network, between cellular networks, or between the mobile device and a public switched telephone network (PSTN).

Mobile device 3002 can further include at least one input/output port 3080, a power supply 3082, a satellite navigation system receiver 3084, such as a Global Positioning System (GPS) receiver, an accelerometer 3086, and/or a physical connector 3090, which can be a USB port, IEEE 1394 (FireWire) port, and/or RS-232 port. The illustrated components of mobile device 3002 are not required or all-inclusive, as any components can be deleted and other components can be added as would be recognized by one skilled in the art.

In an embodiment, mobile device 3002 is configured to perform any of the above-described functions of workflow designer 106. Computer program logic for performing these functions may be stored in memory 3020 and executed by processor 3010.

Figure 31:
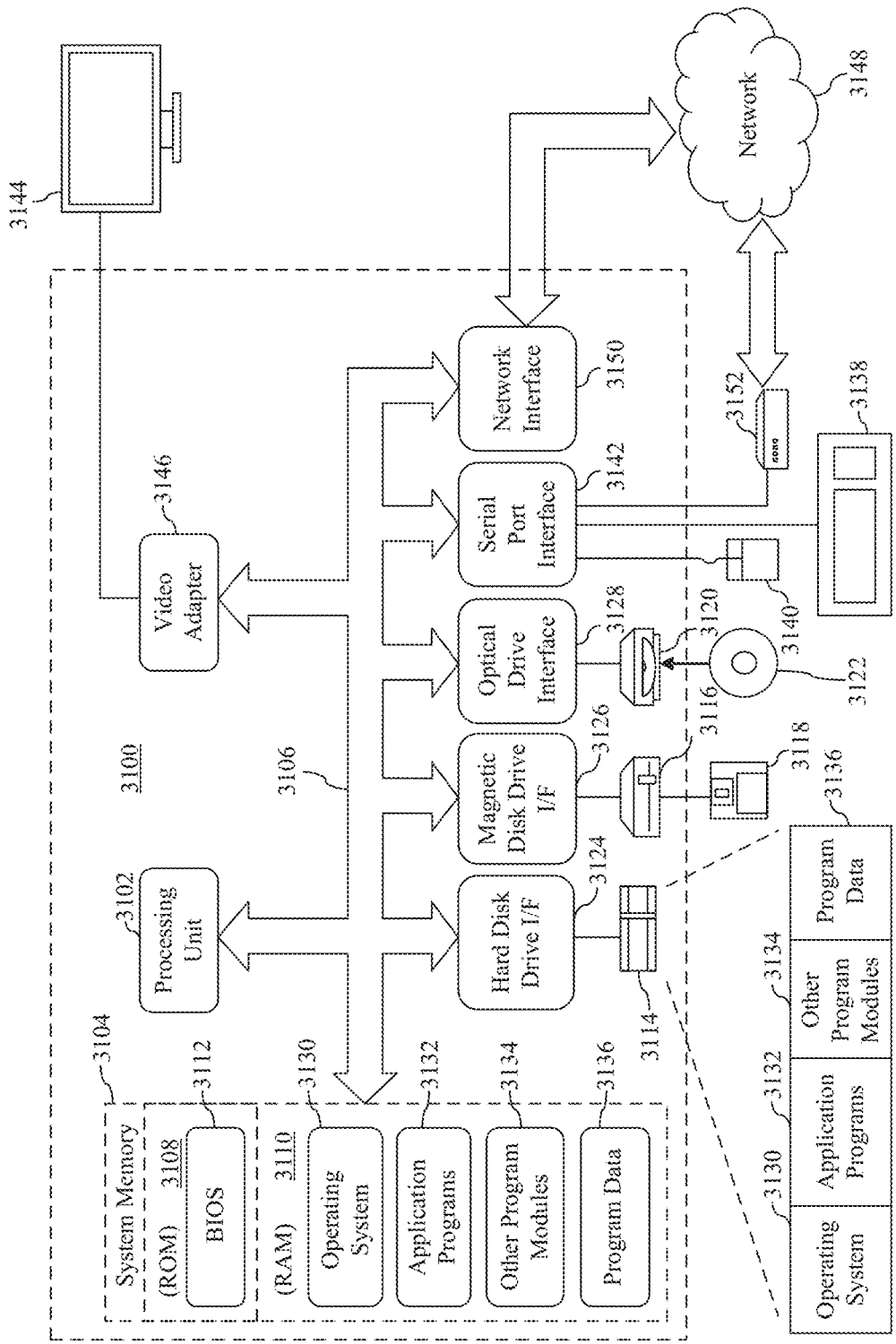
FIG. 31 is a block diagram of an example processor-based computer system that may be used to implement various embodiments.

FIG. 31 depicts an example processor-based computer system 3100 that may be used to implement various embodiments described herein. For example, any of computing device 102, server 134, and mobile device 3002 may be implemented in one or more computing devices similar to computing device 3100 in stationary or mobile computer embodiments, including one or more features of computing device 3000 and/or alternative features. The description of system 3100 provided herein is provided for purposes of illustration, and is not intended to be limiting. Embodiments may be implemented in further types of computer systems, as would be known to persons skilled in the relevant art(s).

As shown in FIG. 31, system 3100 includes a processing unit 3102, a system memory 3104, and a bus 3106 that couples various system components including system memory 3104 to processing unit 3102. Processing unit 3102 may comprise one or more microprocessors or microprocessor cores. Bus 3106 represents one or more of any of several types of bus structures, including a memory bus or memory controller, a peripheral bus, an accelerated graphics port, and a processor or local bus using any of a variety of bus architectures. System memory 3104 includes read only memory (ROM) 3108 and random access memory (RAM) 3110. A basic input/output system 3112 (BIOS) is stored in ROM 3108.

System 3100 also has one or more of the following drives: a hard disk drive 3114 for reading from and writing to a hard disk, a magnetic disk drive 3116 for reading from or writing to a removable magnetic disk 3118, and an optical disk drive 3120 for reading from or writing to a removable optical disk 3122 such as a CD ROM, DVD ROM, BLU-RAY™ disk or other optical media. Hard disk drive 3114, magnetic disk drive 3116, and optical disk drive 3120 are connected to bus 3106 by a hard disk drive interface 3124, a magnetic disk drive interface 3126, and an optical drive interface 3128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These programs include operating system 3130, one or more application programs 3132, other programs 3134, and program data 3136. Application programs 3132 or other programs 3134 may include, for example, computer program logic (e.g., computer program code or instructions) for implementing workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, template generation logic 1202, workflow step combiner 1206, description generator 1208, usage analyzer 1210, template generation logic 1802, compatible workflow step determiner 1804, selective anonymizer 2404, workflow template publisher 2406, audience-based anonymizer 2702, user identity-based anonymizer 2704, organization-based anonymizer 2706, context-based anonymizer 2708, flowchart 200, flowchart 1000, flowchart 1300, flowchart 1400, step 1502, step 1602, flowchart 1700, flowchart 1900, flowchart 2100, flowchart 2200, flowchart 2500, step 2802, and/or step 2902 (including any suitable step of flowcharts 200, 1000, 1300, 1400, 1700, 1900, 2100, 2200, 2500), and/or further embodiments described herein.

A user may enter commands and information into system 3100 through input devices such as a keyboard 3138 and a pointing device 3140 (e.g., a mouse). Other input devices (not shown) may include a microphone, joystick, game controller, scanner, or the like. In one embodiment, a touch screen is provided in conjunction with a display 3144 to allow a user to provide user input via the application of a touch (as by a finger or stylus for example) to one or more points on the touch screen. These and other input devices are often connected to processing unit 3102 through a serial port interface 3142 that is coupled to bus 3106, but may be connected by other interfaces, such as a parallel port, game port, or a universal serial bus (USB). Such interfaces may be wired or wireless interfaces.

Display 3144 is connected to bus 3106 via an interface, such as a video adapter 3146. In addition to display 3144, system 3100 may include other peripheral output devices (not shown) such as speakers and printers.

System 3100 is connected to a network 3148 (e.g., a local area network or wide area network such as the Internet) through a network interface 3150, a modem 3152, or other suitable means for establishing communications over the network. Modem 3152, which may be internal or external, is connected to bus 3106 via serial port interface 3142.

As used herein, the terms "computer program medium," "computer-readable medium," and "computer-readable storage medium" are used to refer to physical hardware media such as the hard disk associated with hard disk drive 3114, removable magnetic disk 3118, removable optical disk 3122, other physical hardware media such as RAMs, ROMs, flash memory cards, digital video disks, zip disks, MEMs, nanotechnology-based storage devices, and further types of physical/tangible hardware storage media (including memory 1220 of FIG. 12). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 3132 and other programs 3134) may be stored on the hard disk, magnetic disk, optical disk, ROM, RAM, or other hardware storage medium. Such computer programs may also be received via network interface 3150, serial port interface 3142, or any other interface type. Such computer programs, when executed or loaded by an application, enable computing device 3100 to implement features of embodiments discussed herein. Accordingly, such computer programs represent controllers of the computing device 3100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In a first embodiment, a method in a computing device comprises: determining a plurality of workflows steps in a library of workflow steps; automatically generating one or more workflow templates, each automatically generated workflow template including a combination of at least two of the workflow steps in the library; and storing the one or more workflow templates in a library of templates.

In an embodiment, the automatically generating comprises: selecting a trigger step of the workflow steps in the workflow step library; selecting at least one action step of the workflow steps in the workflow step library; and automatically combining the selected trigger step and the selected at least one action step to generate a workflow template.

In an embodiment, the automatically generating further comprises: automatically generating text describing operations performed by the generated workflow template.

In an embodiment, the automatically generating comprises: iterating through all combinations of trigger steps in the workflow step library with action steps in the workflow step library to generate a plurality of workflow templates.

In an embodiment, the method further comprises: enabling an administrator to curate the template library to eliminate one or more workflow templates from the template library.

In an embodiment, the automatically generating comprises: analyzing statistics regarding workflows created by developers to determine a workflow created by the developers at a frequency greater than a predetermined threshold, and generating a workflow template corresponding to the determined workflow; and wherein said storing comprises: storing in the template library the workflow template corresponding to the determined workflow.

In an embodiment, the method further comprises: displaying in a graphical user interface a template gallery including indications of the one or more workflow templates in the template library; and enabling developers to interact with the graphical user interface to select workflow templates from the template library for including in workflows.

In another embodiment, a system comprises: one or more processors; and a memory that stores computer program logic for execution by the one or more processors, the computer program logic including: template generation logic configured to automatically generate one or more workflow templates, each automatically generated workflow template including a combination of at least two of workflow steps of a workflow step library, and to store the one or more workflow templates in a template library.

In an embodiment, the template generation logic comprises: a workflow step combiner configured to select a trigger step of the workflow steps in the workflow step library, select at least one action step of the workflow steps in the workflow step library, and automatically combine the selected trigger step and the selected at least one action step to generate a workflow template.

In an embodiment, the template generation logic further comprises: a description generator configured to automatically generate text describing operations performed by the generated workflow template.

In an embodiment, the workflow step combiner is configured to iterate through all combinations of trigger steps in the workflow step library with action steps in the workflow step library to generate a plurality of workflow templates.

In an embodiment, a user interface enables an administrator to curate the template library to eliminate one or more workflow templates from the template library.

In an embodiment, the template generation logic comprises: a usage analyzer configured to analyze statistics regarding workflows created by developers to determine a workflow created by the developers at a frequency greater than a predetermined threshold; a workflow step combiner configured to generate a workflow template corresponding to the determined workflow, and to store in the template library the workflow template corresponding to the determined workflow.

In an embodiment, the computer program logic further comprises: a template gallery generator configured to display in a graphical user interface a template gallery including indications of the one or more workflow templates in the template library, and to enable developers to interact with the graphical user interface to select workflow templates from the template library for including in workflows.

In another embodiment, a method in a computing device comprises: enabling a developer to select a first workflow step; automatically determining one or more workflow steps compatible with the first workflow step; and displaying the determined one or more workflow steps in association with the first workflow step.

In an embodiment, the method further comprises: enabling the developer to select a second workflow step of the displayed one or more workflow steps; and inserting the second workflow step into a workflow template interconnected with the first workflow step.

In an embodiment, the automatically determining comprises: automatically determining one or more trigger steps compatible with the first workflow step in response to the first workflow step being an action step; and automatically determining one or more action steps compatible with the first workflow step in response to the first workflow step being a trigger step.

In another embodiment, a system comprises: one or more processors; and a memory that stores computer program logic for execution by the one or more processors, the computer program logic including: a step selector configured to enable a developer to select a first workflow step; a compatible workflow step determiner configured to automatically determine one or more workflow steps compatible with the first workflow step; and a user interface generator configured to display the determined one or more workflow steps in association with the first workflow step.

In an embodiment, the step selector is configured to enable the developer to select a second workflow step of the displayed one or more workflow steps, and to insert the second workflow step into a workflow template interconnected with the first workflow step.

In an embodiment, the compatible workflow step determiner is configured to automatically determine one or more trigger steps compatible with the first workflow step in response to the first workflow step being an action step, and to automatically determine one or more action steps compatible with the first workflow step in response to the first workflow step being a trigger step.

In an embodiment, a method in a computing device comprises: receiving an automated workflow template for publication that includes parameters; automatically anonymizing at least a portion of the parameters included in the automated workflow template to generate an anonymized automated workflow template; and publishing the anonymized automated workflow template.

In an embodiment, the automatically anonymizing is performed based on an intended target audience for the publication of the received automated workflow template.

In an embodiment, the automatically anonymizing is performed based on an identity of the user having selected the received automated workflow template for the publication.

In an embodiment, the automatically anonymizing is performed based on an organization within which the received automated workflow template is being shared by the publication.

In an embodiment, the automatically anonymizing is performed based on a context in which the received automated workflow template was built.

In an embodiment, the automatically anonymizing comprises: displaying a user interface control to enable a developer to select whether to anonymize a messaging account identifier in the received automated workflow template.

In an embodiment, the selectively anonymizing comprises: partially anonymizing a parameter included in the received automated workflow template.

In another embodiment, a system comprises: one or more processors; and a memory that stores computer program logic for execution by the one or more processors, the computer program logic including: a selective anonymizer configured to automatically anonymize at least a portion of a set of parameters included in an automated workflow template to generate an anonymized automated workflow template; and a workflow template publisher configured to publish the anonymized automated workflow template.

In an embodiment, the selective anonymizer is configured to automatically anonymize the at least a portion of a set of parameters based on an intended target audience for the publication of the received automated workflow template.

In an embodiment, the selective anonymizer is configured to automatically anonymize the at least a portion of a set of parameters based on an identity of the user having selected the received automated workflow template for the publication.

In an embodiment, the selective anonymizer is configured to automatically anonymize the at least a portion of a set of parameters based on an organization within which the received automated workflow template is being shared by the publication.

In an embodiment, the selective anonymizer is configured to automatically anonymize the at least a portion of a set of parameters based on a context in which the received automated workflow template was built.

In an embodiment, a UI (user interface) generator is configured to display a user interface control to enable a developer to select whether to anonymize a messaging account identifier in the received automated workflow template.

In an embodiment, the selective anonymizer is configured to partially anonymize a parameter included in the received automated workflow template.

In an embodiment, a system comprises: one or more processors; and a memory that stores program code configured to be executed by the at least one processors to perform operations, the operations including: receiving an automated workflow template for publication that includes parameters; automatically anonymizing at least a portion of the parameters included in the automated workflow template to generate an anonymized automated workflow template; and publishing the anonymized automated workflow template.

In an embodiment, the automatically anonymizing is performed based on an intended target audience for the publication of the received automated workflow template.

In an embodiment, the automatically anonymizing is performed based on an identity of the user having selected the received automated workflow template for the publica- In an embodiment, the automatically anonymizing is performed based on an organization within which the received automated workflow template is being shared by the publication.

In an embodiment, the automatically anonymizing is performed based on a context in which the received automated workflow template was built.

In an embodiment, the automatically anonymizing comprises: displaying a user interface control to enable a developer to select whether to anonymize a messaging account identifier in the received automated workflow template.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method in a computing device, comprising:
receiving an automated workflow template for publication, the automated workflow template formed from multiple workflow steps that comprise parameters each having a corresponding parameter value, and being selectable for inclusion in workflows;
automatically anonymizing a parameter of the parameters included in the automated workflow template to generate an anonymized automated workflow template that is an anonymized form of the received automated workflow template with the parameter value of the parameter purged or replaced to anonymize the parameter, the anonymized parameter without an actual parameter value; and
publishing the anonymized automated workflow template to be implemented as a workflow by at least receiving an input value for the anonymized parameter.

2. The method of claim 1, wherein said automatically anonymizing is performed based on an intended target audience for the publication of the received automated workflow template.

3. The method of claim 1, wherein said automatically anonymizing is performed based on an identity of the user having selected the received automated workflow template for the publication.

4. The method of claim 1, wherein said automatically anonymizing is performed based on an organization within which the received automated workflow template is being shared by the publication.

5. The method of claim 1, wherein said automatically anonymizing is performed based on a context in which the received automated workflow template was built.

6. The method of claim 1, wherein said automatically anonymizing comprises:
displaying a user interface control to enable a developer to select whether to anonymize a messaging account identifier in the received automated workflow template.

7. The method of claim 1, wherein said automatically anonymizing comprises:
partially anonymizing a parameter included in the received automated workflow template.

8. A system, comprising:
one or more processors; and
a memory that stores computer program logic for execution by the one or more processors, the computer program logic including:
a selective anonymizer configured to automatically anonymize parameter of parameters that each have a corresponding parameter value included in workflow steps of an automated workflow template to generate an anonymized automated workflow template, the anonymized automated workflow template being an anonymized form of the received automated workflow template with a parameter value of the parameter purged or replaced to anonymize the parameter; and
a workflow template publisher configured to publish the anonymized automated workflow template.

9. The system of claim 8, wherein the selective anonymizer is configured to automatically anonymize the at least a portion of a set of parameters based on an intended target audience for the publication of the received automated workflow template.

10. The system of claim 8, wherein the selective anonymizer is configured to automatically anonymize the at least a portion of a set of parameters based on an identity of the user having selected the received automated workflow template for the publication.

11. The system of claim 8, wherein the selective anonymizer is configured to automatically anonymize the at least a portion of a set of parameters based on an organization within which the received automated workflow template is being shared by the publication.

12. The system of claim 8, wherein the selective anonymizer is configured to automatically anonymize the at least a portion of a set of parameters based on a context in which the received automated workflow template was built.

13. The system of claim 8, wherein a UI (user interface) generator is configured to display a user interface control to enable a developer to select whether to anonymize a messaging account identifier in the received automated workflow template.

14. The system of claim 8, wherein the selective anonymizer is configured to partially anonymize a parameter included in the received automated workflow template.

15. A system, comprising:
one or more processors; and
a memory that stores program code configured to be executed by the at least one processors to perform operations, the operations including:
receiving an automated workflow template for publication that includes a first workflow step selected by a user;
automatically determining a second workflow step for inclusion in the automated workflow template compatible with the first workflow step;
insert the second workflow step in the automated workflow template, the first and second workflow step each having at least one parameter such that the automated workflow template includes parameters;
automatically anonymizing a parameter of the parameters included in the automated workflow template to generate an anonymized automated workflow template that is an anonymized form of the received automated workflow template with a parameter value of the parameter purged or replaced to anonymize the parameter; and
publishing the anonymized automated workflow template.

16. The system of claim 15, wherein said automatically anonymizing is performed based on an intended target audience for the publication of the received automated workflow template.

17. The system of claim 15, wherein said automatically anonymizing is performed based on an identity of the user having selected the received automated workflow template for the publication.

18. The system of claim 15, wherein said automatically anonymizing is performed based on an organization within which the received automated workflow template is being shared by the publication.

19. The system of claim 15, wherein said automatically anonymizing is performed based on a context in which the received automated workflow template was built.

20. The system of claim 15, wherein said automatically anonymizing comprises:
   displaying a user interface control to enable a developer to select whether to anonymize a messaging account identifier in the received automated workflow template.

\* \* \* \* \*